(12) United States Patent
Kudo

(10) Patent No.: US 6,774,355 B2
(45) Date of Patent: Aug. 10, 2004

(54) OPTICAL ENCODER

(75) Inventor: Koichi Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 10/103,790

(22) Filed: Mar. 25, 2002

(65) Prior Publication Data
US 2002/0134927 A1 Sep. 26, 2002

(30) Foreign Application Priority Data

Mar. 23, 2001 (JP) ........................................ 2001-083928

(51) Int. Cl.⁷ ................................................ G01D 5/34
(52) U.S. Cl. .............. 250/231.13; 250/231; 250/231.18
(58) Field of Search .................................... 250/231.13

(56) References Cited

U.S. PATENT DOCUMENTS

| | | | |
|---|---|---|---|
| 5,006,703 A | * 4/1991 | Shikunami et al. | .... 250/231.13 |
| 5,442,428 A | 8/1995 | Takahashi et al. | |
| 5,574,558 A | 11/1996 | Kudo et al. | |
| 5,697,031 A | 12/1997 | Kamiya et al. | |
| 5,701,566 A | 12/1997 | Bisaiji et al. | |
| 5,729,024 A | 3/1998 | Baba et al. | |
| 5,818,062 A | 10/1998 | Baba et al. | |
| 5,870,650 A | 2/1999 | Takahashi et al. | |
| 5,913,092 A | 6/1999 | Bisaiji et al. | |
| 5,929,436 A | 7/1999 | Baba et al. | |
| 5,983,060 A | 11/1999 | Namekata et al. | |
| 6,006,062 A | 12/1999 | Takahashi et al. | |
| 6,031,633 A | 2/2000 | Andoh et al. | |
| 6,035,157 A | 3/2000 | Takahashi et al. | |
| 6,223,008 B1 | 4/2001 | Takahashi et al. | |
| 6,252,682 B1 | 6/2001 | Baba et al. | |
| 6,269,228 B1 | 7/2001 | Kayahara et al. | |
| 6,445,900 B2 | 9/2002 | Fukao et al. | |

* cited by examiner

Primary Examiner—John R. Lee
Assistant Examiner—Phillip A. Johnston
(74) Attorney, Agent, or Firm—Oblon, Spivak, McClelland, Maier & Neustadt, P.C.

(57) ABSTRACT

An optical encoder of the present invention includes a scale movable in a preselected direction and formed with an array of slits in the direction of movement of the scale. A light source emits a light beam toward the scale. A light-sensitive portion transforms light transmitted through or reflected from the scale to a corresponding electric signal. The slits each have a dimension, as measured in the direction perpendicular to the direction of movement of the scale, limited in accordance with the diameter of a beam spot to be formed on the scale. With this configuration, the encoder is low cost and can correct the mounting error of the scale without resorting to precise adjustment at the time of mounting.

18 Claims, 27 Drawing Sheets

FIG. 7
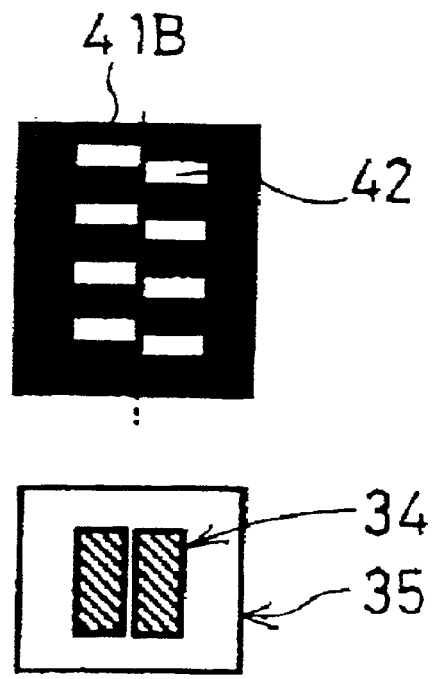
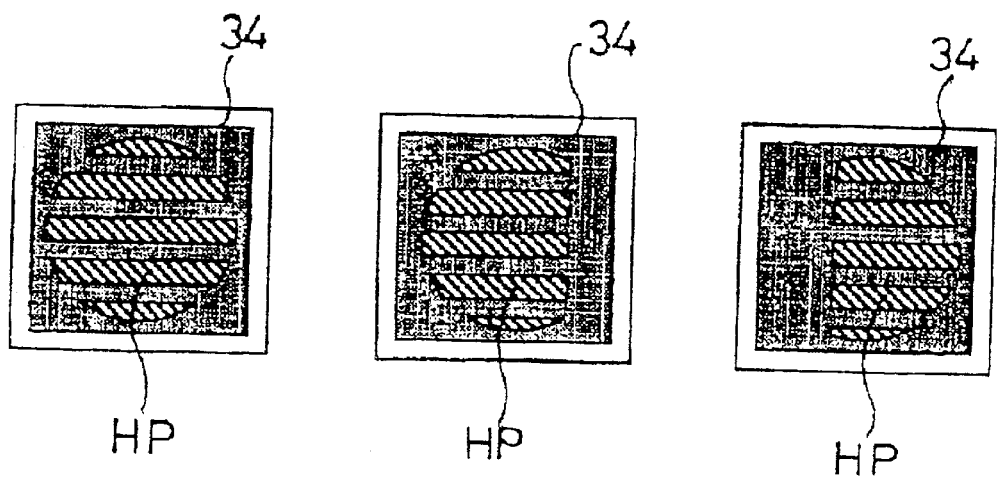
FIG. 8A FIG. 8B FIG. 8C

OPTICAL ENCODER

BACKGROUND OF THE INVENTION

1. Field of the Invention

The present invention relates to an optical encoder, e.g., a linear encoder for the measurement of a straight range or a straight velocity or a rotary encoder for use in a sensor responsive to the angle and angular velocity of a rotary body or for controlling the rotation of, e.g., a photoconductive drum included in a copier.

2. Description of the Background Art

The prerequisite with a conventional optical encoder is that a scale be mounted with utmost precision. Any error in the mounting angle of a scale (linear encoder) or the eccentricity of a scale (rotary encoder) directly translates into a measurement error. Particularly, in the case of a rotary encoder, an error ascribable to eccentricity is as great as an amount of eccentricity divided by the diameter of a scale. Therefore, when resolution is high, a rigid housing and accurate position adjustment are essential and make a rotary encoder extremely expensive.

Today, a rotary encoder implemented as a module for a cost reduction purpose is available and made up of a rotary scale and a sensing head. The user of this type of rotary encoder is expected to assemble the scale and head by using a jig. However, when such a rotary encoder is mounted to general equipment, the scale need accurate mounting and adjustment that increase cost.

In light of this, Japanese Patent Laid-Open Publication No. 7-140844, for example, discloses a rotary encoder using two sensing heads shifted in position from each other by 180°. The sum of angles measured by the two sensing heads is halved for thereby obviating the mounting error of an encoder wheel and the irregularity of rotation signals. Although this rotary encoder may accurately determine angular velocity, the two sensing heads increase the cost of the encoder and therefore the cost of equipment to which it is applied.

SUMMARY OF THE INVENTION

It is therefore an object of the present invention to provide an optical encoder that is low cost, capable of correcting the mounting error of a scale despite that it does not need accurate adjustment at the time of mounting, and applicable even to equipment for which it has heretofore been considered to be not feasible.

It is another object of the present invention to provide a rotary encoder capable of correcting the eccentricity of an encoder wheel with a single sensing head, allowing the encoder wheel to be mounted without any precise adjustment, and determining a rotation angle at low cost.

An optical encoder of the present invention includes a scale movable in a preselected direction and formed with an array of slits in the direction of movement of the scale. A light source emits a light beam toward the scale. A light-sensitive portion transforms light transmitted through or reflected from the scale to a corresponding electric signal. The slits each have a dimension, as measured in the direction perpendicular to the direction of movement of the scale, limited in accordance with the diameter of a beam spot to be formed on the scale. With this configuration, the encoder is low cost and can correct the mounting error of the scale without resorting to precise adjustment at the time of mounting.

BRIEF DESCRIPTION OF THE DRAWINGS

The above and other objects, features and advantages of the present invention will become more apparent from the following detailed description taken with the accompanying drawings in which:

FIG. 7 shows another specific index scale applicable to the second embodiment;

FIG. 8A shows the pattern of a light beam transmitted through the scale of the second embodiment when the scale and a sensing head are accurately aligned;

FIGS. 8B and 8C each show a particular pattern of the light beam appearing when the scale and sensing head are not accurately aligned;

DESCRIPTION OF THE PREFERRED EMBODIMENTS

Figure 1:
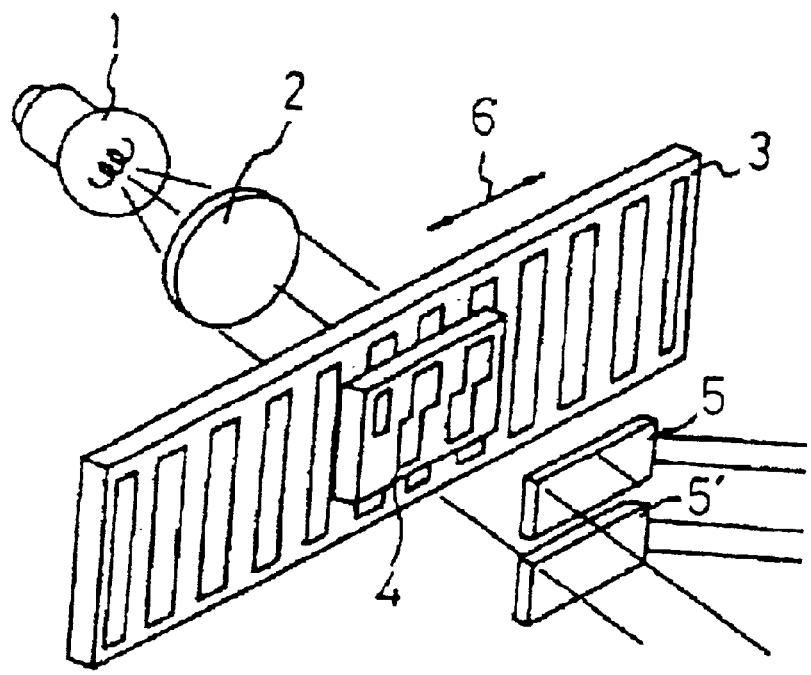
FIG. 1 is an isometric view showing a conventional linear encoder, which is a specific form of an optical encoder.

To better understand the present invention, brief reference will be made to a conventional optical linear encoder, shown in FIG. 1. As shown, the linear encoder includes a light source 1. A collimator lens 2 projects light issuing from the light source 1 on a scale 3 in the form of parallel rays. The scale 3 is an optical lattice having a preselected lattice constant and movable in a direction indicated by a double-headed arrow 6. An index scale 4 is an optical device having the same lattice constant as the scale 3. The index scale 4 has two lattices different from each other by quarter wavelength in order to determine the direction of movement of the scale 3. Sensors 5 and 5', which constitute a light-sensitive portion, are respectively responsive to light transmitted through the above two optical lattices.

When the scale 3 moves in the direction 6, the light output from the collimator lens 2 is selectively transmitted or intercepted on the basis of a positional relation between the scale 3 and the index scale 4. The sensor 5 senses the variation of the quantity of light while outputting electric signals having a sinusoidal waveform. The amount of displacement of the scale 3 is determined in terms of the number of such electric signals.

A rotary encoder, which is another optical encoder, has a scale implemented as an encoder wheel formed with slits, which are spaced in the circumferential direction of the encoder wheel.

The conventional optical encoders described above have the following problem left unsolved. If the scale 3 of the linear encoder is not accurate in mounting angle or if the encoder wheel of the rotary encoder is eccentric, then the error directly translates into a measurement error. Therefore, the scale 3 or the encoder wheel must be mounted with utmost accuracy.

More specifically, the scale 3, for example, has openings each being greater in width that than the openings of the index scale 4. This configuration broadens the allowable alignment range between the scale 3 and a sensing head including the light source and light-sensitive portion. The broad allowable alignment range, however, increases probability that even when the scale 3 is mounted in an inclined position, the user of the encoder performs measurement without noticing the error. Consequently, the scale 3 cannot fully exhibit its ability even if it has utmost accuracy.

Preferred embodiments of the optical encoder in accordance with the present invention will be described hereinafter. Each embodiment to be described uses reference numerals particular thereto, so that identical reference numerals do not always designate identical structural elements.

First Embodiment

Figure 2:
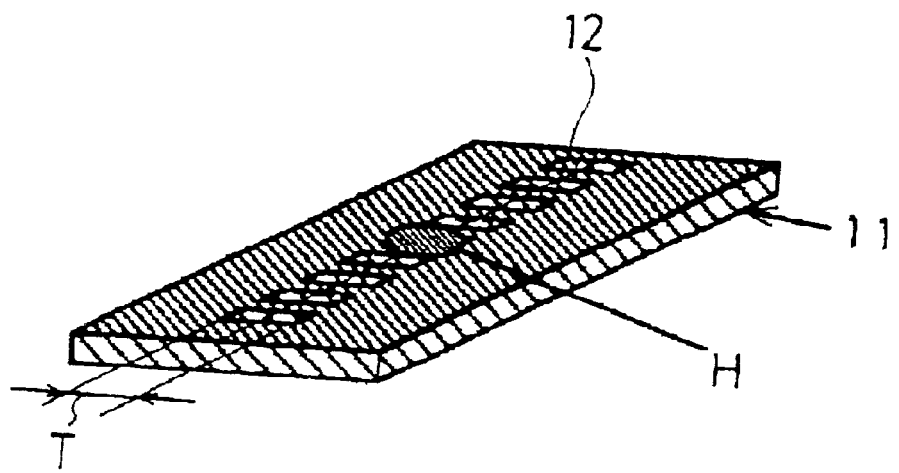
FIG. 2 is an isometric view showing a linear encoder representative of a first embodiment of the optical encoder in accordance with the present invention.

Referring to FIG. 2, a scale 11 included in a linear encoder, which is a specific form of an optical encoder embodying the present invention, is shown. As shown, the scale 11 is movable in a preselected direction (lengthwise direction) and formed with an array of slits 12; the array extends in the lengthwise direction of the scale 11. A light source, not shown, emits a light beam H toward the scale 11. A light-sensitive portion, not shown, receives light transmitted through or reflected from the scale 11.

Each slit 12 has a dimension T in the direction perpendicular to the direction of movement of the scale 11. The illustrative embodiment limits the dimension T in accordance with the diameter of a beam spot to be formed on the scale 11 by the light beam H. Generally, to form the slits 12 in the scale 11, chromium may be patterned on a glass sheet by a semiconductor process. If low resolution is allowable, then use may be made of punching or etching of a metal sheet. Further, because the slits 12 should only transmit light therethrough, use may be made of a photographic process for implementing a transmittance distribution.

The image of the light beam H transmitted through the scale 11 is asymmetrical because of the positional relation between the scale 11 and a sensing head, which includes the light source and light-sensitive portion. This, coupled with the limited dimension T of each slit 12, allows the alignment error of the scale 11 and head to be determined. The size of each slit 12 is not defined specifically because the optimum size depends on the head to be combined with the scale 11.

Figure 3A:
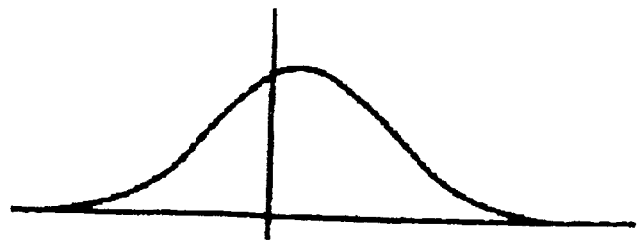
FIGS. 3A through 3C respectively show the profile of a light beam incident to a scale included in the first embodiment, the profile of a slit formed in the scale, and the profile of a light beam output from the scale.
Figure 3B:
Figure 3C:
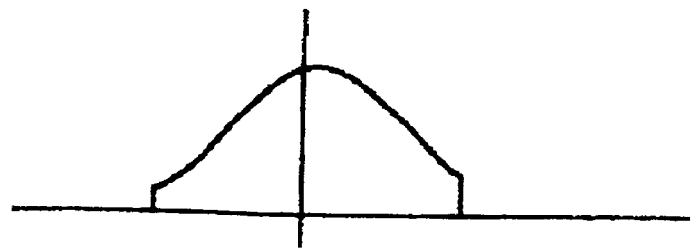

The operation of the illustrative embodiment will be described hereinafter. FIGS. 3A, 3B and 3C respectively show the profile of a light beam incident on each slit 12, the profile of the slit, and the profile of the light beam transmitted through the slit 12. As shown in FIG. 3A, a light beam issuing from an ordinary light source has a profile with an approximately Gaussian distribution. As shown in FIG. 3c, when the light beam is incident to the slit 12 with some deviation from the center of the slit 12, the slit 12 restricts the light beam and provides it with a profile asymmetrical with respect to the center.

By determining the degree of asymmetry of the above profile, it is possible to determine a positional relation between the scale 11 and the head. The degree of asymmetry can be determined only if light intensity is observed. More specifically, the light beam with the profile shown in FIG. 3A has the highest intensity when it is symmetrical with respect to the center. Therefore, to accurately align the head and scale 11, they should only be brought to a relative position where the output signal of the light-sensitive portion has the greatest strength.

As stated above, by monitoring the strength of the output signal of the light-sensitive portion, it is possible to accurately align the scale 11 and head. Further, by observing the amplitude of the output signal varying during signal detection, it is possible to determine an error in the mounting angle of the scale 11. Data representative of the error can be used to correct the output signal.

Figure 4:
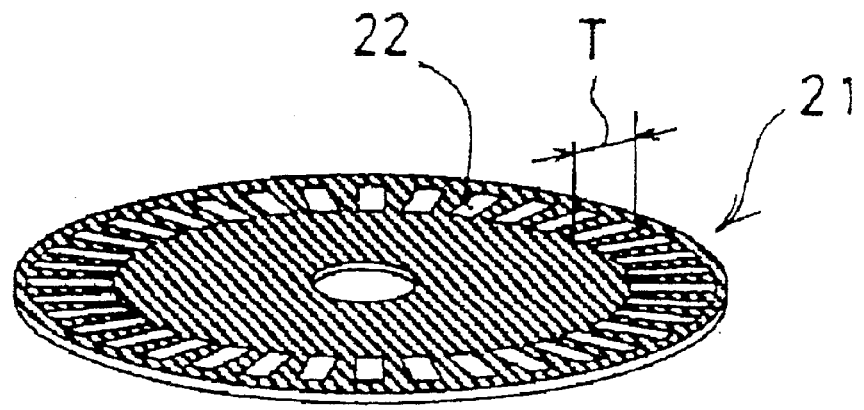
FIG. 4 is an isometric view showing a rotary encoder to which the first embodiment is applied.

FIG. 4 shows a specific scale or encoder wheel 21 included in a rotary encoder to which the concept of the illustrative embodiment is also applicable. As shown, slits 22 are formed in the scale 21 at equally spaced intervals along the circumference of the scale 21. Each slit 22 has a dimension T in the direction perpendicular to the direction of rotation of the scale 21. Again, the dimension T is limited in accordance with the diameter of a beam spot to be formed on the scale 21. It is therefore possible to detect the mounting error and eccentricity of the encoder wheel 21 and therefore to correct measurement errors by using such data.

Second Embodiment

Figure 5:
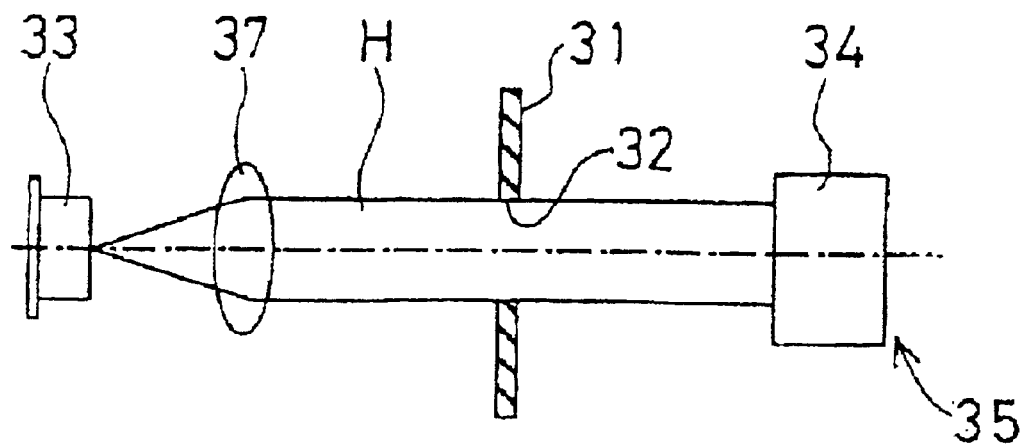
FIG. 5 shows a second embodiment of the present invention.

FIG. 5 shows a second embodiment of the optical encoder in accordance with the present invention. As shown, the encoder includes a scale 31 movable in a preselected direction (perpendicular to the sheet surface of FIG. 5) and formed with an array of slits 32 in the direction of movement. A light source 33 emits a light beam H toward the scale 31. A light-sensitive portion 34 receives light transmitted through the scale 31 and performs photoelectric transduction. The light source 33 and light-sensitive portion 34 are included in a single sensing head 35. Each slit 32 has a dimension, which is shown in FIG. 5, perpendicular to the direction of movement of the scale 31 that is substantially equal to the diameter of a beam spot formed on the scale 31 by the light beam H. The light source 33 is implemented as an LED (Light Emitting Diode) or an LD (Laser Diode) by way of example. A lens 37 controls the divergence of light issuing from this kind of light source 33, thereby forming the above beam spot on the scale 31.

The dimension of the light beam H in the direction of movement of the scale 31 may be equal to the dimension of the slit 32 in the above direction.

Figure 6:
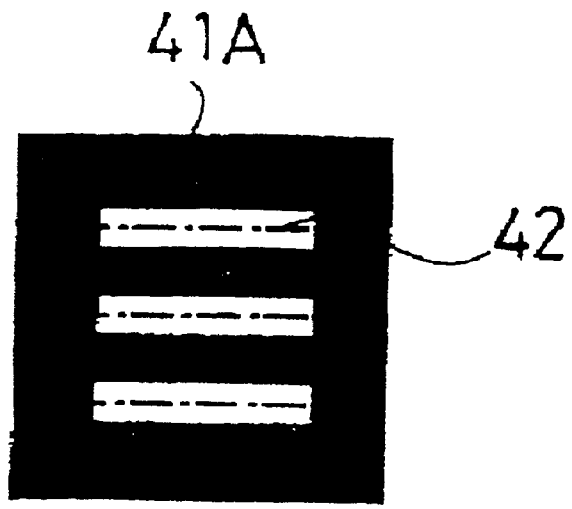
FIG. 6 shows a specific index scale applicable to the second embodiment.

To reduce detection error ascribable to the smear or scratch of the scale 31, an index scale should preferably be used for observing a plurality of slits at the same time as in the conventional encoder. FIGS. 6 and 7 each show a particular configuration of the index scale. While the index scale 4, FIG. 1, is positioned in the vicinity of the scale 3, the former may be remote from the latter if the light source has some coherency. Specifically, FIG. 6 shows an index scale 41A formed with slit 41 in a single phase while FIG. 7 shows an index scale 41B formed with slits 42 in two phases. As for the configuration of FIG. 7, the light-sensitive portion 34 is divided into two zones respectively assigned to the two phases.

In the illustrative embodiment, the light beam H is partly transmitted through the slits 32 and partly intercepted by the scale 31. The dimension T of the slit 32 is limited while the light beam H is sized substantially equal to the size of each slit 32. As a result, the pattern of the light beam incident to the light-sensitive portion 34 varies in accordance with the positional relation between the head 35 and the scale 31, as shown in FIGS. 8A, 8B and 8C. The center of the head 35 and that of the scale 31 are coincident in FIG. 8A, but not coincident in FIGS. 8B and 8C. In the conditions shown in FIGS. 8B and 8C, the light beam is partly intercepted with the result that the intensity of light incident to the light-sensitive portion decreases. By observing the variation of the light intensity, it is possible to detect the alignment error of the head 35 and scale 31.

Third Embodiment

The first and second embodiments are capable of detecting the alignment error of the head and scale and determining the amount of error specifically. However, neither one of the two embodiments can determine the direction of the error.

Figure 9A:
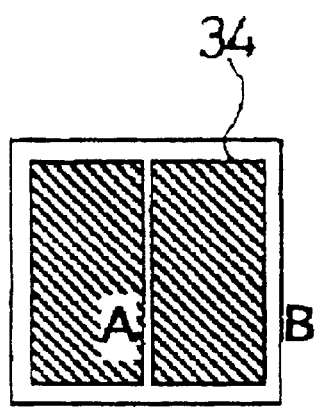
FIG. 9A show a light-sensitive area divided into two portions and representative of a third embodiment of the present invention.
Figure 9B:
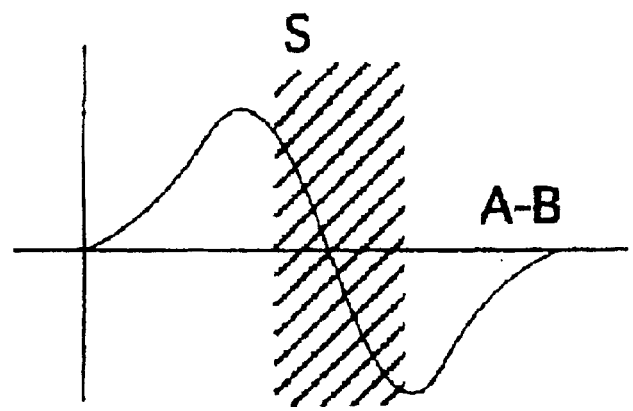
FIG. 9B shows how a difference signal varies in the third embodiment.

As shown in FIG. 9A, the illustrative embodiment divides the light-sensitive portion 34 into two zones A and B in the direction perpendicular to the direction of movement of the scale 31. As shown in FIG. 9B, a signal representative of a difference between the zones A and B varies in accordance with how each slit 32 transmits the incident light beam. Therefore, by setting the encoder in such a manner as to confine the variation in a range S at the center of 9B, it is possible to execute detection with high linearity. With this configuration, the illustrative embodiment can accurately detect not only the alignment error of the head and scale, but also the direction of the alignment error.

Fourth Embodiment

Figure 10:
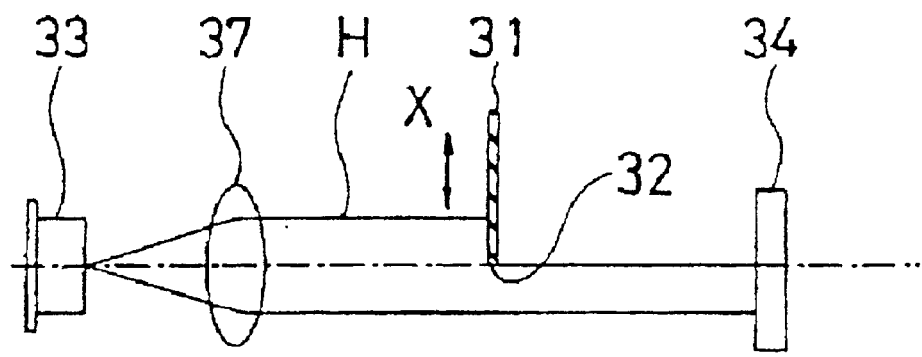
FIG. 10 shows a fourth embodiment of the present invention.

FIG. 10 shows a fourth embodiment of the present invention configured to detect the direction of alignment error at low cost. In the foregoing embodiments, adjustment is made such that the center of the light beam H coincides with the center of the slit 32. In the fourth embodiment, adjustment is made beforehand such that part of the beam H overlaps one edge of the slit 32.

Figure 11:
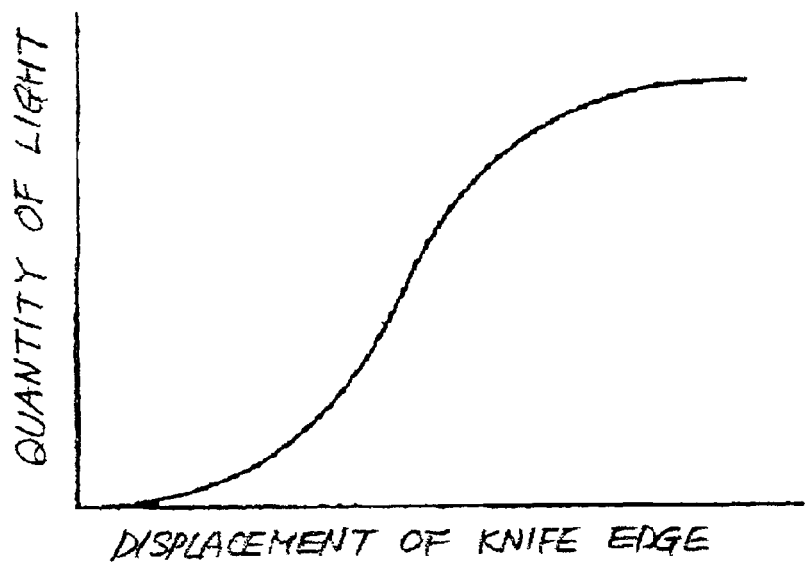
FIG. 11 is a graph showing a relation between the displacement of a slit (knife edge) included in the fourth embodiment and the quantity of incident light.

For example, as shown in FIG. 10, assume that the head and scale are positioned relative to each other such that the center of the light beam coincides with one edge of the slit 32. Then, the quantity of light is halved by the slit 32 before reaching the light-sensitive portion 34. The output signal of the light-sensitive portion 34 decreases in strength when the edge of the slit 32 is moved to further restrict the light beam H. As a result, the signal strength varies along a curve shown in FIG. 11 in accordance with the position of the edge or knife edge of the slit 32. This allows the direction of variation to be determined without resorting to the divided light-sensitive zones.

Fifth Embodiment

Figure 12:
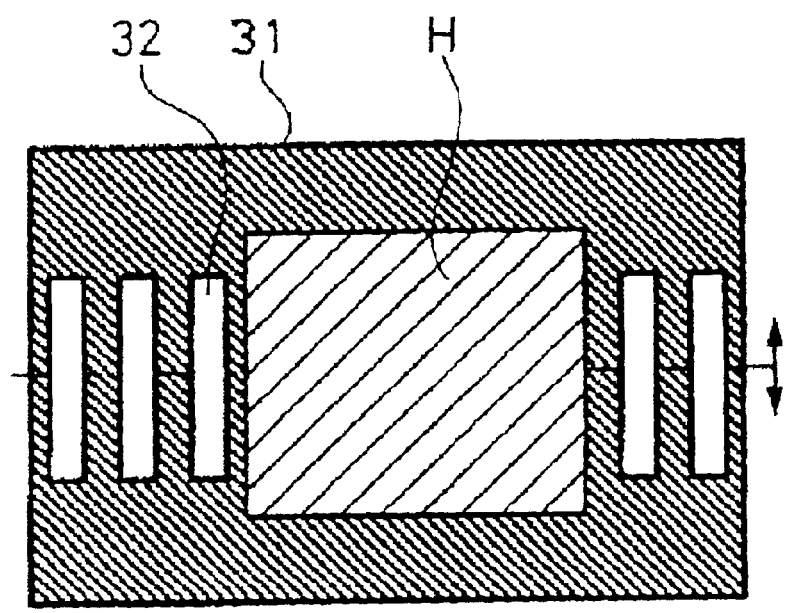
FIG. 12 shows a fifth embodiment of the present invention.

Reference will be made to FIG. 12 for describing a fifth embodiment of the present invention. The quantity of light to be incident to the light-sensitive portion 34 is susceptible to the smear and scratch of the scale 31 as well as to the dimensional accuracy of the slit 32. Therefore, the quantity of light is apt to fail to faithfully represent the amount of error when sensed alone. The fifth embodiment insures accurate measurement of an alignment error despite, e.g., the smear of the scale 31.

As for construction, the illustrative embodiment is characterized in that the light beam H issuing from the light source is uniform in intensity (no intensity distribution) on the scale 31 and is uniform in shape (no shape distribution) in the direction perpendicular to the direction of the movement of the scale 31. To implement such a light beam H, use maybe made of a diffuser positioned at the rear of the light source or a homogenizer for used in a stepper. Further, to prevent the light beam H from having a shape distribution in the direction perpendicular to the direction of movement of scale 31, the light beam with no intensity distribution may be transmitted through a rectangular mask.

Figure 13:
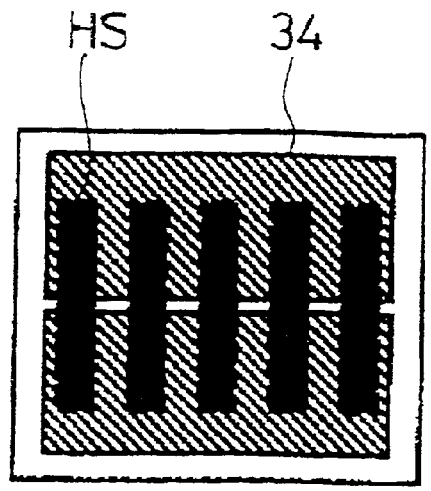
FIG. 13 shows the image of a light beam formed on a light-sensitive portion included in the fifth embodiment.

FIG. 13 shows a beam image HS formed on the light-sensitive portion 34 when the above unique light beam H is incident to the portion 34. In the illustrative embodiment, when the positional relation between the scale 31 and head varies, the beam image HS simply moves on the light-sensitive surface upward or downward. Therefore, the total quantity of light incident to the light-sensitive portion 34 does not vary. Even if the total quantity of light varies due to, e.g., the smear of the scale 31, an alignment error can be accurately detected. This is because the ratio of the difference (A−B) of the bisected light-sensitive portion 34 to the total quantity of light (A+B) is constant.

Sixth Embodiment

Figure 14:
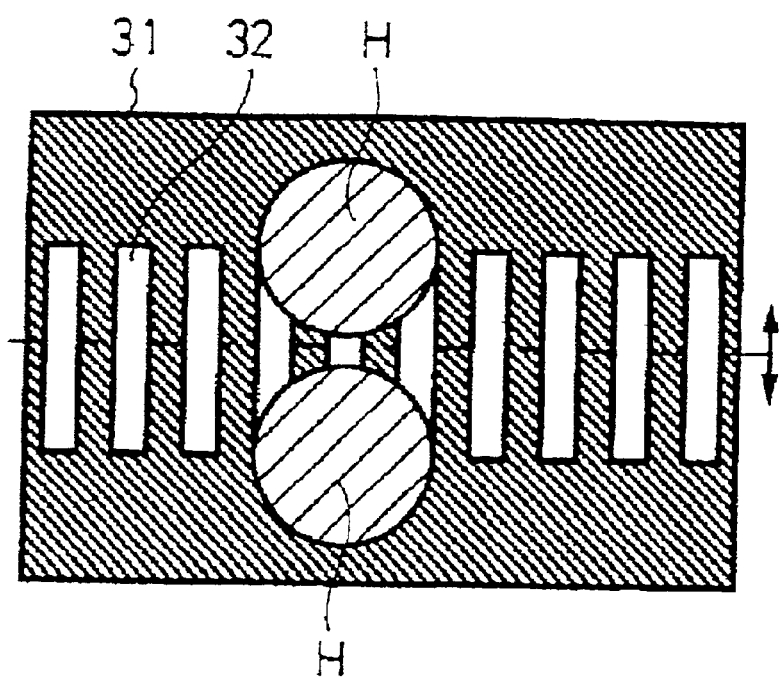
FIG. 14 shows a sixth embodiment of the present invention.

This embodiment achieves the same advantages as the previous embodiment without resorting to a homogenizer or similar expensive optical device. As for construction, the illustrative embodiment includes a light source emitting two light beams H. As shown in FIG. 14, the light beams H are spaced from each other by a distance substantially equal to the width of the slit 32, as measured on the scale 31. For this purpose, use may be made of two light sources or a beam splitter, half mirror or similar beam splitting device.

Figure 15:
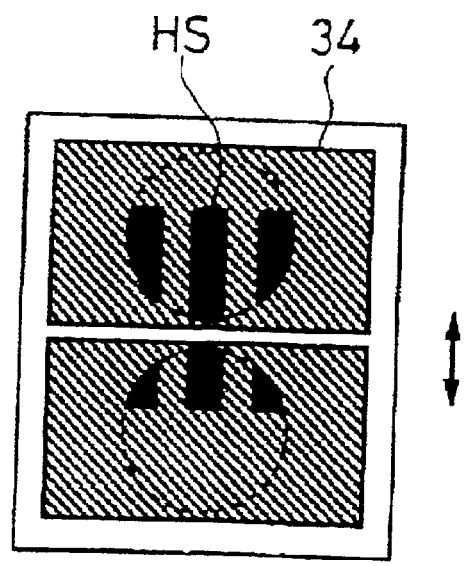
FIG. 15 shows the image of a beam formed on a light-sensitive portion included in the sixth embodiment.

FIG. 15 shows beam images HS formed on the light-sensitive portion 34 by the two light beams H incident to the scale 31. So long as the head and scale are accurately aligned with each other, the centers of the light beams H are positioned at the edges of the slit 32. Each beam image HS has a quantity of light that is one-half of the quantity of light of the light beam H. More specifically, when the quantities of light transmitted through the slit 32 are the same, a quantity of light corresponding to one light beam is transmitted through the slit 32 in total. When the positional relation between the scale and head varies, the quantity of light increases at one zone of the light-sensitive area, but decreases at the other zone of the same, as illustrated. However, so long as the two beams have substantially the same profile, the increment at one zone and the decrement at the other zone are equal to each other, implementing the quantity of light of one light beam in total. This obviates the need for an expensive optical device.

As stated above, the first to sixth embodiments achieve various unprecedented advantages, as enumerated below.

(1) By monitoring the intensity of a signal output from the light-sensitive portion, it is possible to adequately align the scale and head, i.e., light source and light-sensitive device.

(2) By observing the variation of the amplitude of the output signal, it is possible to determine an error in the mounting angle of the scale.

(3) The output signal can be corrected on the basis of the error signal. This is also true with a rotary encoder.

(4) The encoder is low cost and does not need accurate adjustment at the time of mounting. The encoder can therefore be applied even to equipment for which it has heretofore been considered to be not feasible from the cost standpoint.

(5) A beam spot has a diameter substantially equal to the width of each slit. The slit therefore does not transmit part of an incident light beam if the center of the head and that of the scale are not coincident, thereby reducing the intensity of light incident to a light-sensitive portion. Therefore, by observing the variation of the light intensity, it is possible to determine the alignment error of the head and scale.

(6) When the area of the light-sensitive portion is divided into two or more zones, a signal representative of a difference between the zones varies in accordance with how the slit transmits the light beam. Therefore, if the above signal is confined in a certain range, then detection with high linearity is achievable. It follows that not only the alignment error but also the direction of the error can be determined with accuracy.

(7) The direction of mounting error of the scale can be determined even if the light-sensitive area is not divided.

(8) The alignment error can be measured even if the quantity of light varies due to, e.g., the smear of the scale.

(9) The total quantity of light incident to the light-sensitive portion remains constant without resorting to an expensive optical device. This implements the above advantage (8) at low cost.

Seventh Embodiment

Figure 16:
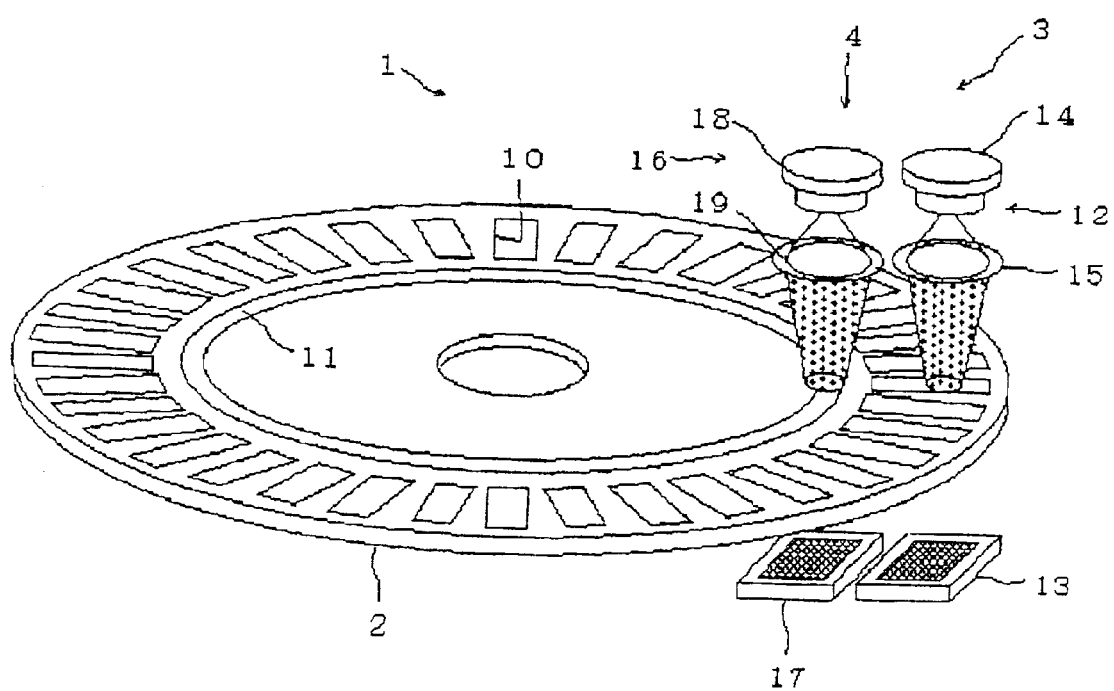
FIG. 16 shows a seventh embodiment of the present invention.

A seventh embodiment of the present invention, which is implemented as a rotary encoder, will be described with reference to FIGS. 16 through 21. As shown in FIG. 16, the rotary encoder, generally 1, includes an encoder wheel 2, a rotation-sensing portion 3, and an eccentricity sensing portion 4. The encoder wheel 2 is formed with a rotation scale 10 and an eccentricity scale 11. The rotation scale 10 is implemented as a plurality of slits that transmit or reflect incident light. The eccentricity scale 11 is implemented as a single annular slit or diffraction grating that also transmits or reflects incident light.

The slits constituting the rotation scale 10 are spaced from each other at a preselected angle or angles in the circumferential direction of the encoder wheel 2, and each extends in the radial direction of the encoder wheel 2 for determining the angular position of the wheel 2. The annular slit constituting the eccentricity scale 11 is used to determine the amount of eccentricity of the encoder wheel 2.

Various conventional technologies are available for producing the encoder wheel 2. For example, a metal sheet maybe etched to form the rotation scale 10 and eccentricity scale 11. Alternatively, the two scales 10 and 11 may be patterned in a metal film formed on a glass sheet by a semiconductor process. Further, the scales 10 and 11 may be printed on a transparent substrate. Moreover, the scales 10 and 11 maybe formed by the photographic exposure and development of a photo emulsion film.

The rotary encoder 1 is characterized by the annular eccentricity scale 11. Therefore, the material, shape and other factors of the encoder wheel 2 are open to choice.

The rotation sensing portion 3 includes a light source 12 and an optical sensor 13. The light source 12 is made up of a light source 14 and a lens 15. While the light source 14 emits light, the lens 15 transforms the light to parallel rays.

The parallel rays are incident to the rotation scale 10 of the encoder wheel 2. The sensor 13 faces the light source 12 with the intermediary of the encoder wheel 2. The light transmitted through the rotation scale 10 of the encoder wheel 2 is incident to the sensor 13.

Figure 17:
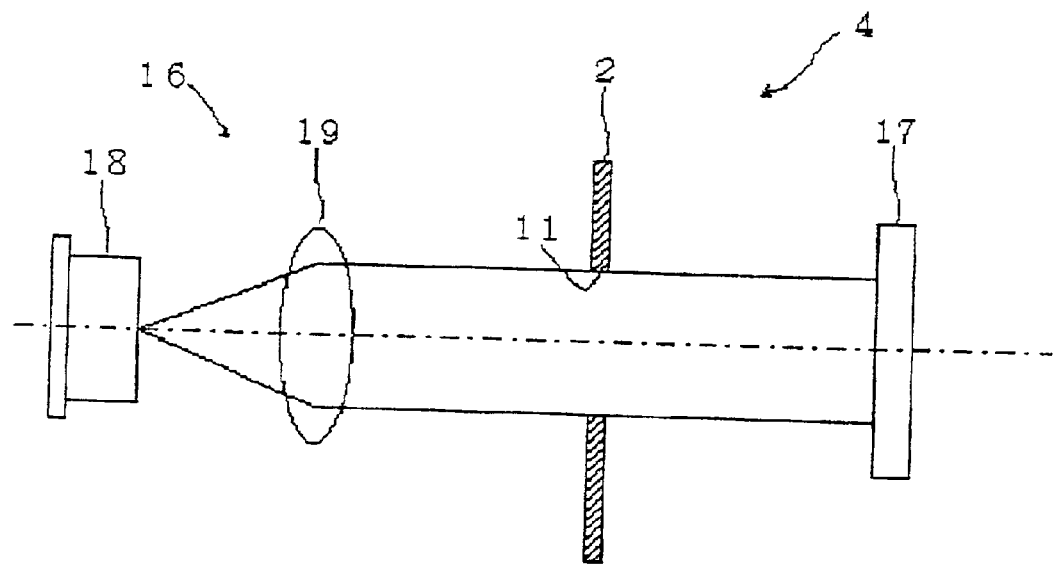
FIG. 17 shows an eccentricity sensing portion included in the seventh embodiment.

As shown in FIG. 17, the eccentricity sensing portion 4 includes a light source 16 and an optical sensor 17. The light source 16 is made up of a light source 18 and a lens 19. While the light source 18 emits light, the lens 19 transforms the light to parallel rays. The parallel rays are incident to the eccentricity scale 11 of the encoder wheel 2. The sensor 17 faces the light source 18 with the intermediary of the encoder wheel 2. The sensor 17 senses the light beam incident thereto that varies in shape when the eccentricity scale 11 is displaced due to the eccentricity of the encoder wheel 2.

Figure 18:
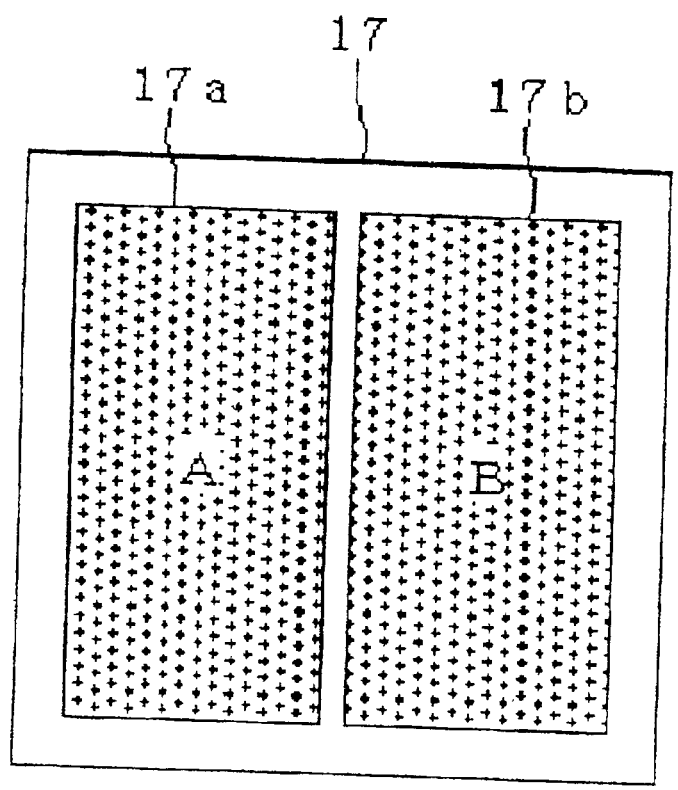
FIG. 18 shows a sensor included in the eccentricity sensing portion of FIG. 17.

As shown in FIG. 18, the sensor 17 responsive to eccentricity is implemented as two light-sensitive devices 17a and 17b separate from each other in the radial direction of the encoder wheel 2. The light-sensitive devices 17a and 17b respectively output signals A and B each being representative of a quantity of incident light. The encoder 1 subtracts the output signal A from the output signal B to thereby determine the amount of eccentricity of the encoder wheel 2. The encoder 1 then corrects the output signal of the sensor 13 of the rotation sensing portion 3 on the basis of the determined eccentricity.

If desired, the rotation scale 10 may be implemented as a diffraction grating, in which case the rotation sensing portion 3 will sense light diffracted by the scale 10. Also, the sensor 13 responsive to rotation may be positioned on the optical axis of light reflected from the rotation scale 10. This is also true with the sensor 17 responsive to eccentricity. Further, the eccentricity scale 11 may be implemented as an array of slits having the same period as the slits of the rotation scale 10, so that a plurality of slits can be sensed at the same time. In addition, the eccentricity scale 11 may be of the kind allowing holographic phase variation to be sensed.

Figure 19:
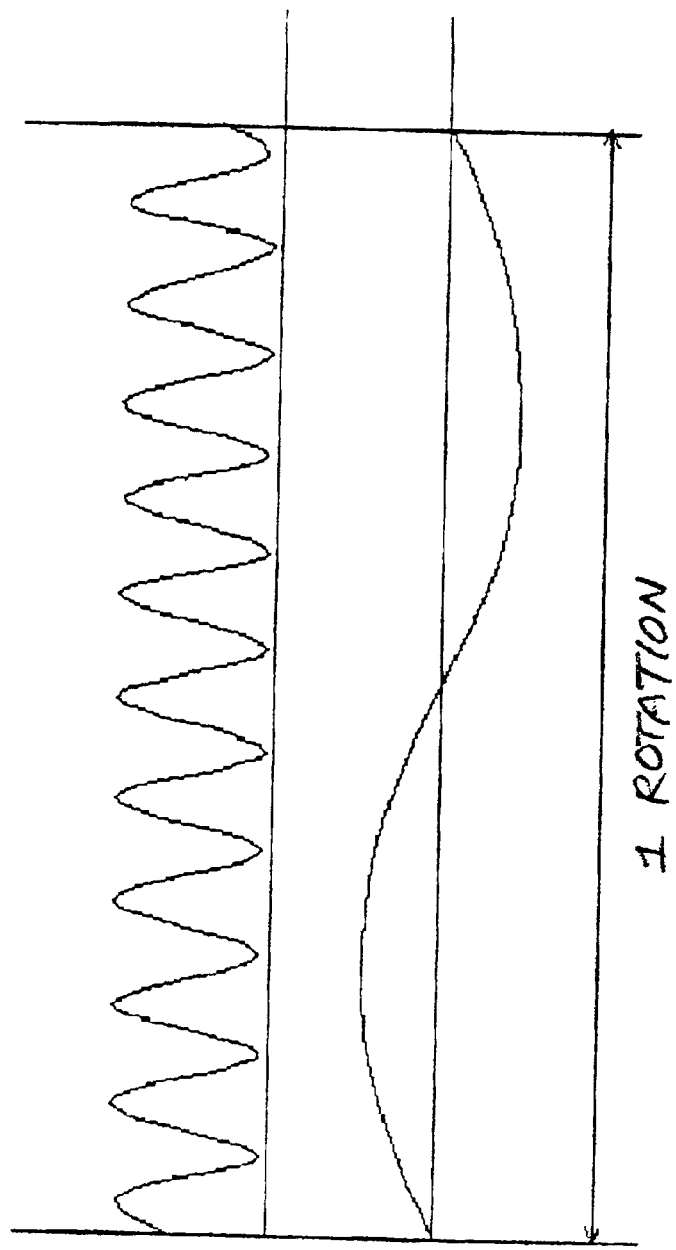
FIG. 19 shows a relation between a rotation signal and an eccentricity signal with respect to one rotation of an encoder wheel included in the seventh embodiment.
Figure 20:
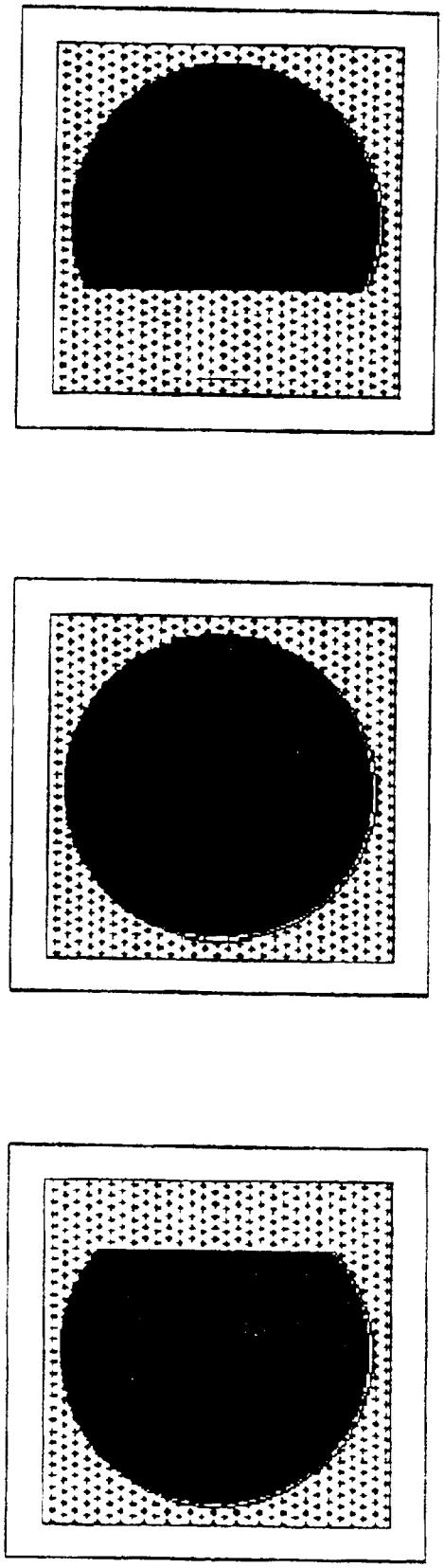
FIGS. 20A through 20C show how a light beam incident to the sensor of FIG. 18 waxes and wanes in accordance with the rotation of an eccentric encoder wheel.

In operation, the lens 15 transforms light issuing from the rotation sensing portion 3 to parallel rays. The parallel rays are transmitted through the slits of the rotation scale 10 and then incident to the sensor 13. FIG. 19 shows specific rotation signals output from the sensor 13 in accordance with the light transmitted through the slits of the rotation scale 10.

In the eccentricity sensing portion 4, the lens 19 transforms light issuing from the light source 18 to parallel rays. The parallel rays are transmitted through the slit of the eccentricity scale 11 and then incident to the sensor 17. Assume that the encoder wheel 2 has eccentricity. The, as shown in FIGS. 20A through 20C specifically, the light beam transmitted through the eccentricity scale 11 waxes and wanes in accordance with the rotation of the encoder wheel 2. Sensing such a light beam, the sensor 17 outputs an eccentricity signal shown in FIG. 19 representative of light intensity. This allows the displacement of the encoder wheel 2 in the direction of eccentricity to be measured. As shown in FIG. 19, the eccentricity signal varies in a sinusoidal fashion relative to the rotation signal with respect to one rotation of the encoder wheel 1, because the eccentricity of the encoder wheel 2 makes one turn when the encoder wheel 2 completes one rotation.

Figure 21:
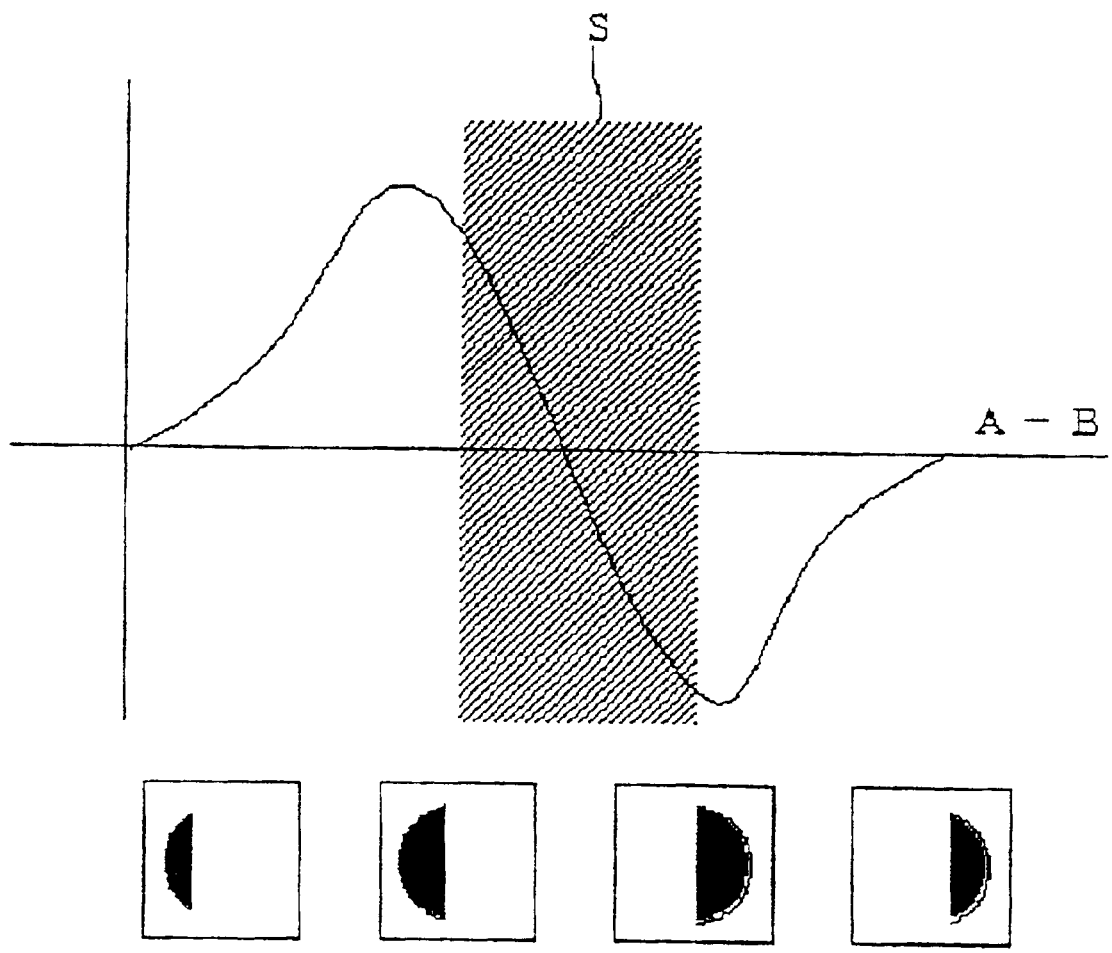
FIG. 21 shows a difference signal representative of a difference between two sensors included in the seventh embodiment.

FIG. 21 shows a difference signal produced by subtracting the output signal B of the light-sensitive device 17b from the output signal A of the light-sensitive device 17a, as stated earlier. If the difference signal is confined in a shadowed range S in FIG. 21, then the difference area achieves linearity and allows the eccentricity of the encoder wheel 2 to be sensed with high sensitivity.

With the above configuration, the illustrative embodiment can determine the angular position and the amount of eccentricity of the encoder wheel 2 at the same time without resorting to the conventional sensors shifted in position from each other at the angle of 180°. The illustrative embodiment corrects the angular position with the amount of eccentricity for thereby accurately determining the angular position at low cost.

Eighth Embodiment

Figure 22:
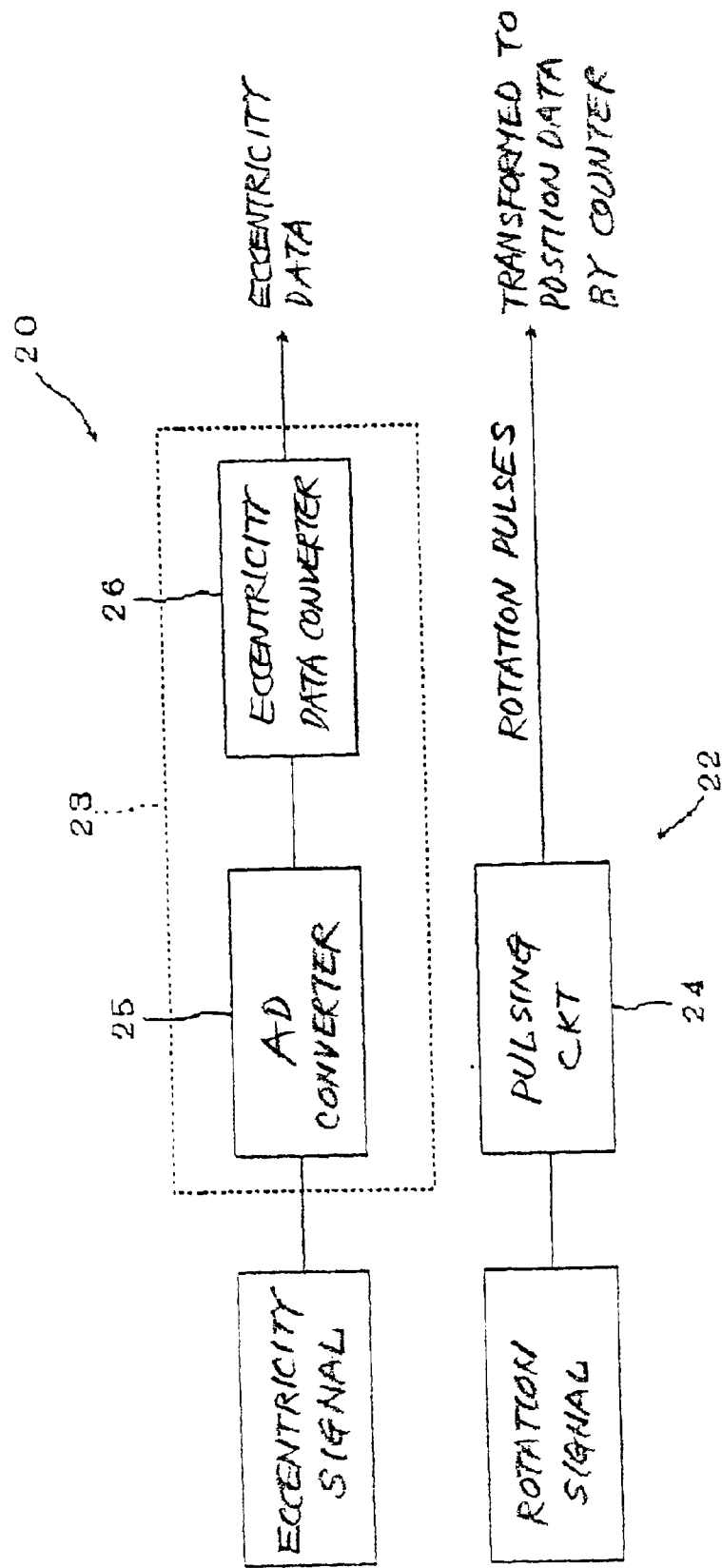
FIG. 22 is a schematic block diagram showing signal processing circuitry representative of an eighth embodiment of the present invention.

Reference will be made to FIG. 22 for describing an eighth embodiment of the present invention implemented as a rotary encoder 20. As shown, the rotary encoder 20 includes signal processing circuitry 21. The illustrative embodiment is also applied to the rotary encoder described in relation to the seventh embodiment, so that identical structural elements are designated by identical reference numerals.

The signal processing circuitry 21 is generally made up of a rotation signal processing section 22 and an eccentricity signal adjusting section 23. The rotation signal processing section 22 is implemented as a pulsing circuit 24 and receives the analog rotation signal from the sensor 13 assigned to rotation. The pulsing circuit 24 converts the analog rotation signal to a pulse and delivers it to a counter, not shown, following the circuitry 21 in the form of a rotation pulse signal. The counter counts such pulses to thereby output position data.

The eccentric signal adjusting section 23 includes an AD (Analog-to-Digital) converter 25 and an eccentricity data converter 26. The analog eccentricity signal output from the sensor 17 assigned to eccentricity is input to the AD converter 25. The AD converter 25 compares the eccentricity signal with, e.g., a preselected threshold value for thereby converting it to a digital eccentricity signal. The eccentricity data converter 26 converts the digital eccentricity signal to eccentricity data and delivers the eccentricity data to, e.g., a counter following the circuitry 21. The eccentricity data is such that one pulse corresponds to a reference amount of eccentricity produced by dividing eccentricity for one rotation of the encoder wheel 2.

In operation, the pulsing circuit 24 converts the analog rotation signal (FIG. 19) output from the sensor 13 to pulses and delivers the pulses to the counter. By counting the pulses, the counter outputs position data representative of the position of the encoder wheel 2, i.e., the position and angle of the wheel 2.

On the other hand, the eccentricity signal (FIG. 19) output from the sensor 17 is sinusoidal and has a period corresponding to one rotation of the encoder wheel 2. It is therefore impossible to directly determine the amount of eccentricity of the encoder wheel 2 with the eccentricity signal. In the illustrative embodiment, the AD converter 25 converts the analog eccentricity signal to a digital eccentricity signal. The eccentricity data converter 26 converts the digital eccentricity signal to the previously mentioned eccentricity data and feeds the data to the counter.

The illustrative embodiment can therefore determine the eccentricity of the encoder wheel 2 as accurately as it determines the position of the encoder wheel 2. In addition, a usual encoder counter suffices for determining eccentricity if A- and B-phase pulses to be used in the encoder are generated in the encoder. This successfully reduces the cost of the rotary encoder 20.

The rotation signal processing section 22 may additionally include the following rotation signal adjusting section. In the rotation signal adjusting section, the eccentricity data output from the eccentricity data converter 26 is converted to the width of rotation pulses output from the pulsing circuit 24. With this configuration, the rotation signal adjusting section adjusts the pulse width of the rotation pulses on the basis of the above eccentricity data, so that the pulse width corresponds to an amount of eccentricity. The adjusting section may configured to calculate a rotation detection error from the eccentricity data, converts the error to a period of time corresponding to a rotation speed, and then multiply the pulses output from the pulsing circuit 24 by a delay. Such a circuitry may even be implemented as software stored in a CPU (Central Processing Unit) although not shown specifically.

Figures 23, 24A, 24B, 24C, 24D, 24E:
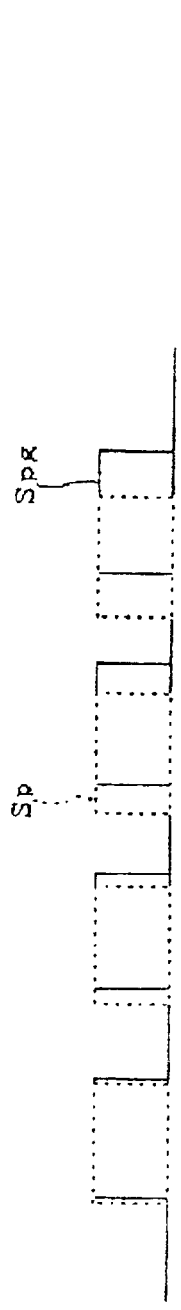
FIG. 23 shows rotation pulses unique to the eighth embodiment.
FIGS. 24A through 24E show output pulses also unique to the eighth embodiment.

More specifically, FIG. 23 shows pulses Sp (phantom lines), or rotation pulse signals, output from the pulsing circuit 24. Assume that the eccentricity of the encoder wheel 2 is δ, that the slits have an angular period of θ, and that the encoder wheel 2 is eccentric. Then, an angle error of δθ occurs in the sensed angle of the slits, which constitute the rotation scale 10.

In light of the above, the rotation signal adjusting section senses an angle detection error ascribable to eccentricity, transforms it to a pulse width, and then multiplies the rotation pulse width by a delay. As a result, as also shown in FIG. 23, rotation pulse signals Spg output from the adjusting section each have a waveform having the error added to its output edge.

In practice, it is difficult to multiply a delay in the negative direction with electric circuitry. This, however, can be coped with by setting a zero delay at a position where the error ascribable to the eccentricity of the encoder wheel 2 is minimum and causing the pulse period to increase with an increase in error. To multiply the rotation by a delay, it is necessary for the rotation speed, i.e., rotation pulse signals to be output first. It follows that the rotation signal adjusting section constitutes a cause of error except for continuous rotation. However, accurate measurement is achievable only if a function of determining whether or not the current rotation is continuous is provided.

The illustrative embodiment can therefore perform counting and angle calculation with the eccentricity-corrected rotation signal by using an ordinary encoder circuit. This further promotes easy use of the accurate rotation signal at low cost.

In a modification of the illustrative embodiment, although not shown, the eccentric signal adjusting section 23 includes an eccentric pulse generating section, a duty varying section, and a pulse adding section, although not shown specifically. Assume that an angle measurement error ascribable to eccentricity, i.e., the eccentricity data output from the eccentricity data converter 26 increase to reach one rotation pulse output from the pulsing circuit 24. Then, the eccentric pulse generating section outputs an eccentricity pulse. The duty varying section reduces the duty ratio of the rotation signal pulse, i.e., reduces the width of a high level. The pulse adding circuit adds the eccentricity pulses and the outputs of the duty varying circuit to thereby output pulses corresponding to the amount of eccentricity.

More specifically, the duty varying section transforms the rotation pulse signals shown in FIG. 24A to narrow rotation pulses shown in FIG. 24B. In response to a reference clock, the duty varying section performs flip-flop operation at the positive-going edge of each rotation signal for thereby outputting a narrow rotation pulse.

The eccentricity data involves an angle error ascribable to eccentricity. In light of this, the eccentricity pulse generating section outputs one pulse when the error reaches one rotation output pulse. For example, the eccentricity pulse generating section divides the eccentricity output with a resistor and then passes it through a comparator. When the eccentricity data exceeds a threshold, as shown in FIG. 24C, the eccentricity pulse generating section outputs one eccentricity pulse. The pulse adding section adds the rotation pulses and eccentricity pulses to thereby output pulses shown in FIG. 24E. Because the pulses shown in FIG. 24E include the eccentricity-corrected pulses in addition to the rotation signals, an ordinary counter can count the pulses of FIG. 24E for implementing angle detection with a minimum of eccentricity error.

The above modification allows an ordinary encoder circuit to perform counting and angle calculation with the rotation signals corrected beforehand. This further promotes easy use of the accurate rotation signals at low cost.

Ninth Embodiment

Figure 25:
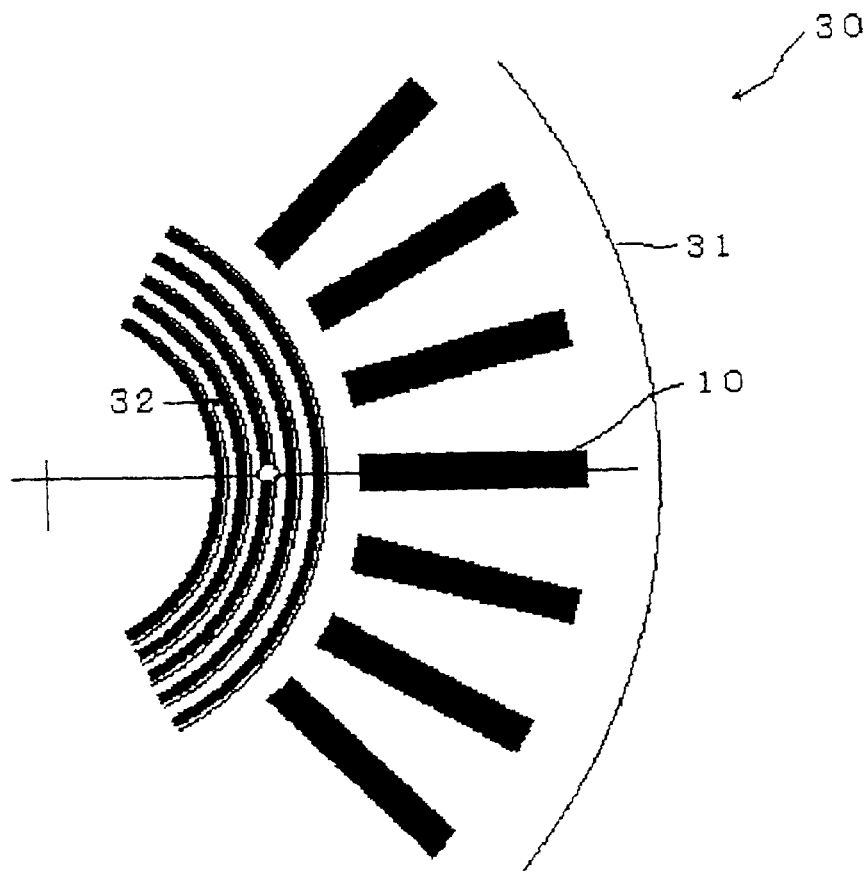
FIG. 25 shows a ninth embodiment of the present invention.

FIG. 25 shows a ninth embodiment of the present invention implemented as a rotary encoder 30. As shown, the rotary encoder 30 includes an encoder wheel 31. The illustrative embodiment is also applied to the rotary encoder described in relation to the seventh embodiment, so that identical structural elements are designated by identical reference numerals.

As shown in FIG. 25, the encoder wheel 31 is formed with the rotation scale 10 and an eccentricity scale 32. The rotation scale 10 is implemented as a plurality of slits that transmit or reflect light. The eccentricity scale 32 is implemented as a plurality of annular concentric slits that also transmit or reflect light. In the illustrative embodiment, five annular slits constitute the eccentricity scale 32. In the eccentricity sensing portion 4, the lens 19 transforms light issuing from the light source 16 to parallel rays. The light beam output from the lens 19 is incident to the eccentricity scale 32.

If the encoder wheel 31 is eccentric, then the light beam incident to the eccentricity scale 32 crosses the annular slits of the scale 32 in accordance with the amount of eccentricity. Receiving the above light beam, the sensor 17 outputs one period of eccentricity data every time eccentricity corresponding to the period of the slits occurs in the encoder wheel 31. By using the eccentricity data in the same manner as the rotation signal, it is possible to determine the amount of eccentricity of the encoder wheel 31.

As for eccentricity, the illustrative embodiment can enhance resolution if the diameter of the beam spot formed on the eccentricity scale 32 is reduced.

In the illustrative embodiment, the eccentricity signal adjusting section 23, FIG. 22, may alternatively be provided with the following configuration although not shown specifically. An eccentricity pulse generator generates a pulse when an angle error ascribable to eccentricity, i.e., eccentricity data output from the eccentricity data converter 26 comes to correspond to one rotation pulse to be output from the pulsing circuit 24. A rotation signal duty converter reduces the duty ratio of the rotation signal pulse, i.e., the duration of a high level. A pulse adder adds the eccentricity pulse and the output of the duty converter to thereby output a pulse corresponding to the amount of eccentricity. A usual counter counts pulses output from the pulse adder. To detect a rotation angle with a minimum of eccentricity error, the slit period of the eccentricity scale 32 is adjusted such that one pulse ascribable to eccentricity accurately coincides with an error corresponding to one pulse of the rotation signal. This configuration implements a signal easy to use without resorting to any special circuit.

As stated above, the encoder wheel 31 is formed with a plurality of annular slits forming the eccentricity scale 32. The illustrative embodiment can therefore enhance resolution for eccentricity detection. Further, the illustrative embodiment outputs an eccentric signal in the form of pulses and therefore does not need a signal adjusting circuit including an A/D converter. This further enhances resolution as to angle detection while reducing cost.

Tenth Embodiment

Figure 26:
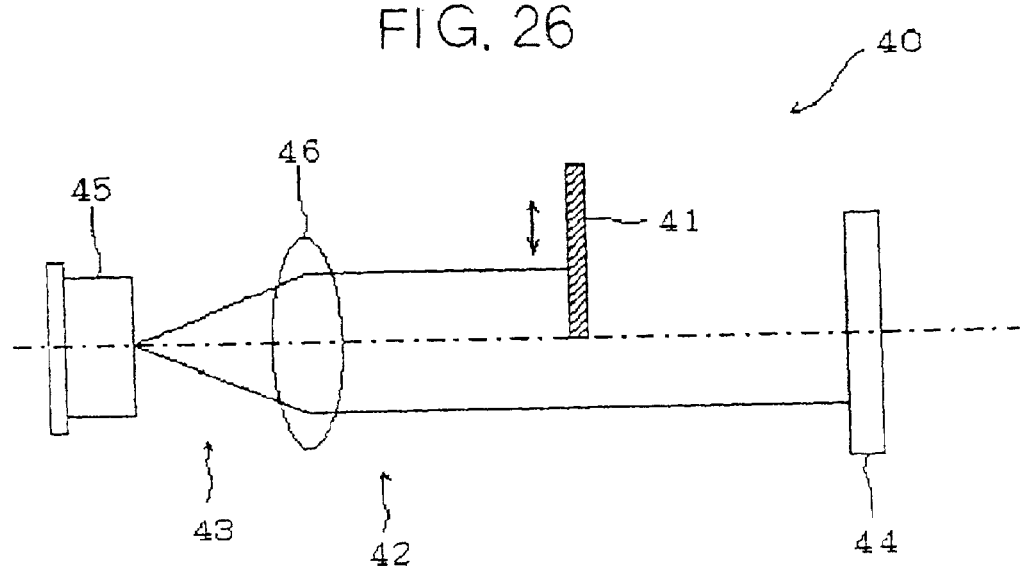
FIG. 26 shows a tenth embodiment of the present invention.
Figure 27:
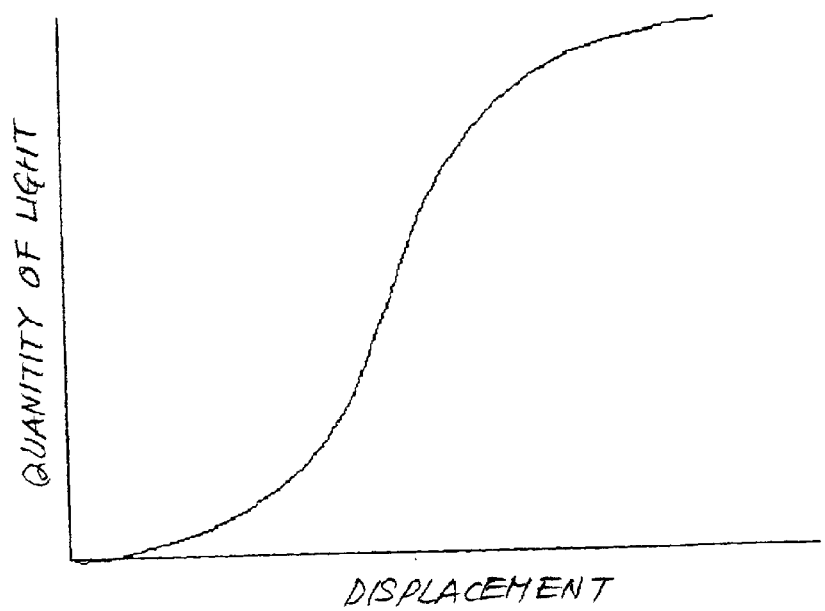
FIG. 27 is a graph showing a relation between the eccentricity of an encoder wheel and the quantity of light incident to a sensor.

FIGS. 26 and 27 show a rotary encoder 40 representative of a tenth embodiment of the present invention. The illustrative embodiment is also applied to the rotary encoder described in relation to the seventh embodiment, so that identical structural elements are designated by identical reference numerals.

As shown in FIG. 26, the rotary encoder 40 includes an eccentricity scale 41 and an eccentricity sensing section 42. The eccentricity scale 51 is implemented as a one-side slit formed in the encoder wheel 2. The eccentricity detecting section 42 includes a light source portion 43 and a sensor 44 assigned to eccentricity. The light source portion 43 includes a light source 45 and a lens 46. The eccentricity sensing section 42 constitutes a knife edge type detection optics.

The lens 46 focuses light issuing from the light source 45 on the eccentricity scale 41. The light may be either one of parallel rays or a condensed light beam. The eccentricity scale or one-side slit 41 is so positioned as to intercept part of the incident light. The sensor 44 is positioned on the optical axis of the light issuing from the light source 43 and receives the entire area of the light.

In the above configuration, if the encoder wheel 2 is eccentric, then the range over which the eccentricity scale 41 intercepts light varies in accordance with the amount of eccentricity. Consequently, the quantity of light incident to the sensor 44 varies due to the movement of the knife edge. FIG. 27 shows the variation of the quantity of incident light occurring when the light is implemented as a circular light beam. By using the linear portion of the curve shown in FIG. 27, it is possible to determine the amount of eccentricity of the encoder wheel 2.

As stated above, the one-sided slit constituting the eccentricity scale 41 makes it needless to use a device having divided zones as the sensor 44.

Eleventh Embodiment

Figure 28:
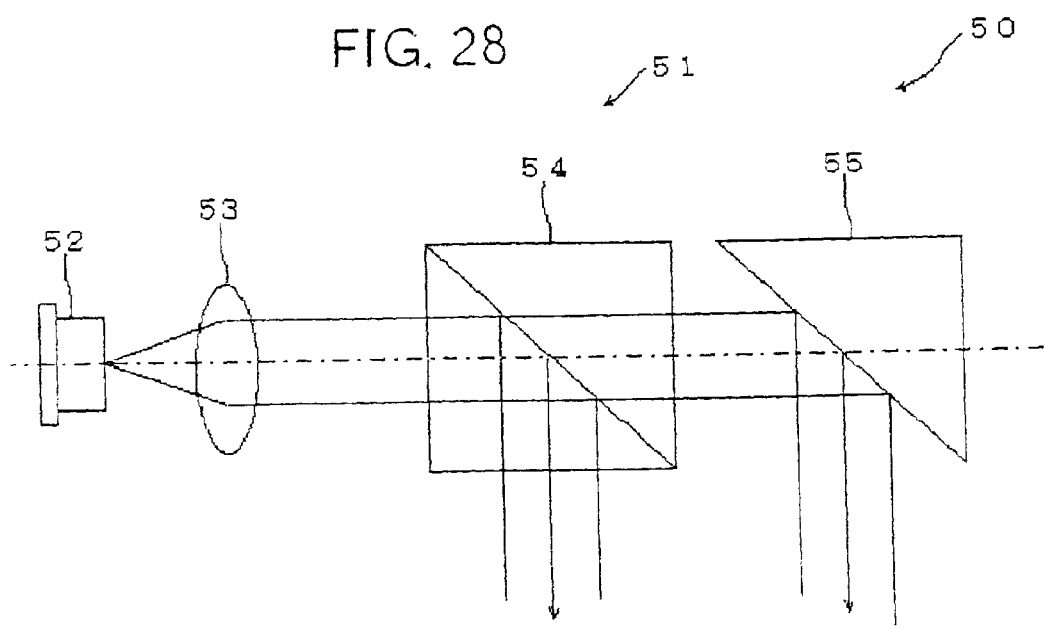
FIG. 28 shows an eleventh embodiment of the present invention.

FIG. 28 shows a rotary encoder 50 representative of an eleventh embodiment of the present invention. The illustrative embodiment is also applied to the rotary encoder described in relation to the seventh embodiment, so that identical structural elements are designated by identical reference numerals.

As shown, the rotary encoder 50 includes a light source portion 51 including a light source 52, a lens 53, and two beam splitting devices 54 and 55. The beam splitting devices 54 and 55 are positioned on the optical axis of a light beam issuing from the light source 52 and are assigned to rotation sensing and eccentricity sensing, respectively. When the beam splitting devices 54 and 55 each are implemented as a polarization beam splitter, the quantity of split beam is variable in terms of incident deflection angle.

The rotary encoder 50 uses the light source portion 52 for sensing both of the rotation and eccentricity of the encoder wheel 2. The lens 52 transforms a light beam issuing from the light source 52 to parallel rays. The beam splitting device 54 reflects part of the parallel rays output from the lens 52 toward the rotation scale 10 of the encoder wheel 2, not shown. At the same time, the beam splitting device 54 transmits the other part of the parallel rays toward the other light beam splitting device 55. The beam splitting device 55 reflects the entire incident beam toward the eccentricity scale 11 of the encoder wheel 2. The illustrative embodiment therefore does not need an expensive light source.

Figure 29:
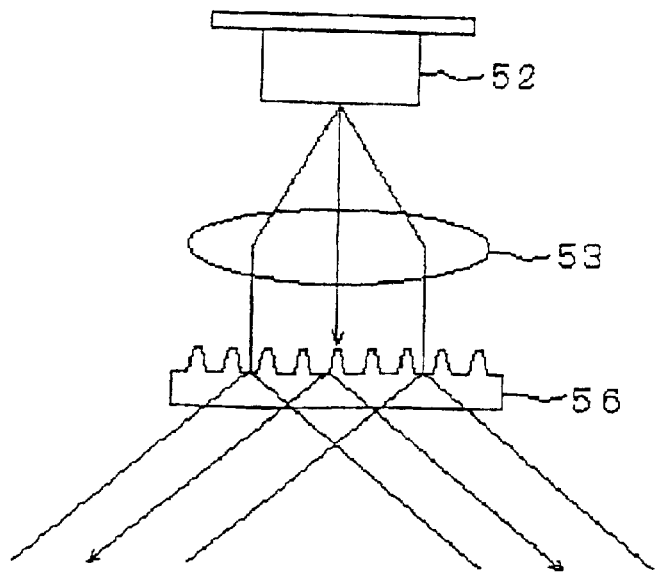
FIG. 29 shows a modification of the eleventh embodiment.

FIG. 29 shows a diffraction grating 56 that may be substituted for the two beam splitting devices 54 and 55. The diffraction grating 56 splits the beam output from the lens 53 into two beams. One of the two split beams is incident to the rotation scale 10 of the encoder wheel 2 while the other beam is incident to the eccentricity scale 11 of the encoder wheel 2.

Twelfth Embodiment

Figure 30:
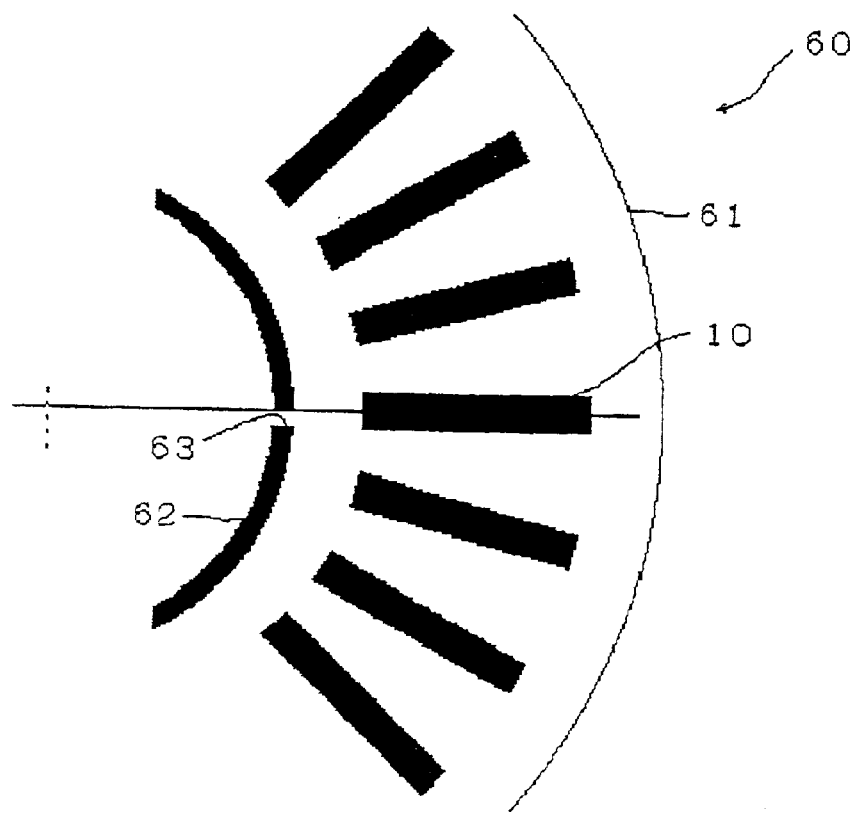
FIG. 30 shows a twelfth embodiment.

FIG. 30 shows a rotary encoder 60 representative of a twelfth embodiment of the present invention. The illustrative embodiment is also applied to the rotary encoder described in relation to the seventh embodiment, so that identical structural elements are designated by identical reference numerals.

As shown in FIG. 30, the rotary encoder 60 includes an encoder wheel 61 formed with the rotation scale 10 and an eccentricity scale 62. Again, the rotation scale 10 is implemented as a plurality of slits that transmit or reflect an incident light beam. The eccentricity scale 62 is implemented as a single annular slit that transmits or reflects an incident light beam. The eccentricity scale 62 includes a mark 63 for sensing an origin. More specifically, a gap where the slit is absent is formed in part of the eccentricity scale 62, forming the mark 63 that intercepts light.

In operation, when the mark 63 of the eccentricity scale 11 intercepts the light beam output from the lens 19, the quantity of light incident to the sensor 17 becomes zero. With this configuration, it is possible to sense the origin of the encoder 60 in addition to eccentricity with a single optics.

The eccentricity signal varies far slower than the rotation signal, so that the omission of part of eccentricity data does not bring about a critical error. In light of this, the mark 63 may be formed at a plurality of points of the eccentricity scale 62. If desired, the mark 63 may be replaced with a code representative of an origin, e.g., a train of gaps where the slit is absent. The code allows the origin to be sensed a plurality of times for a single rotation of the encoder wheel 61, facilitating the return of the encoder to the origin.

In the seventh to twelfth embodiments, the eccentricity signal is used to correct the rotation signal. If desired, the eccentricity signal may additionally be used as a signal representative of the mounting error of the sensing portion or that of the encoder wheel. In such a case, the eccentricity data may be directly output as analog data or may be provided with a threshold for outputting an error signal. The error signal urges the user to check the position of the sensing portion or the eccentricity of the encoder wheel not lying in an allowable range.

As stated above, the seventh to twelfth embodiments have various advantages, as enumerated below.

(1) Not only the angular position but also the eccentricity of an encoder wheel can be sensed without resorting to conventional two sensors shifted in position from each other by the angle of 180°. The sensed eccentricity is used to correct the sensed angular position, so that the rotation angle can be accurately measured at low cost.

(2) An ordinary encoder counter, as distinguished from a special device, suffices for implementing the accurate measurement of rotation angle at low cost. This can be done with an eccentricity pulse signals, e.g., A- and B-phase pulses.

(3) An ordinary encoder circuit can perform counting and angle calculation with a rotation signal corrected by an eccentricity signal beforehand. This further facilitates the use of the accurate rotation signal output at low cost.

(4) An expensive light source is not necessary. This further reduces the cost of the encoder.

(5) The mounting error of sensing means and that of the encoder wheel can be easily seen, so that the mounting operation is easy and accurate.

Thirteenth Embodiment

Figure 31:
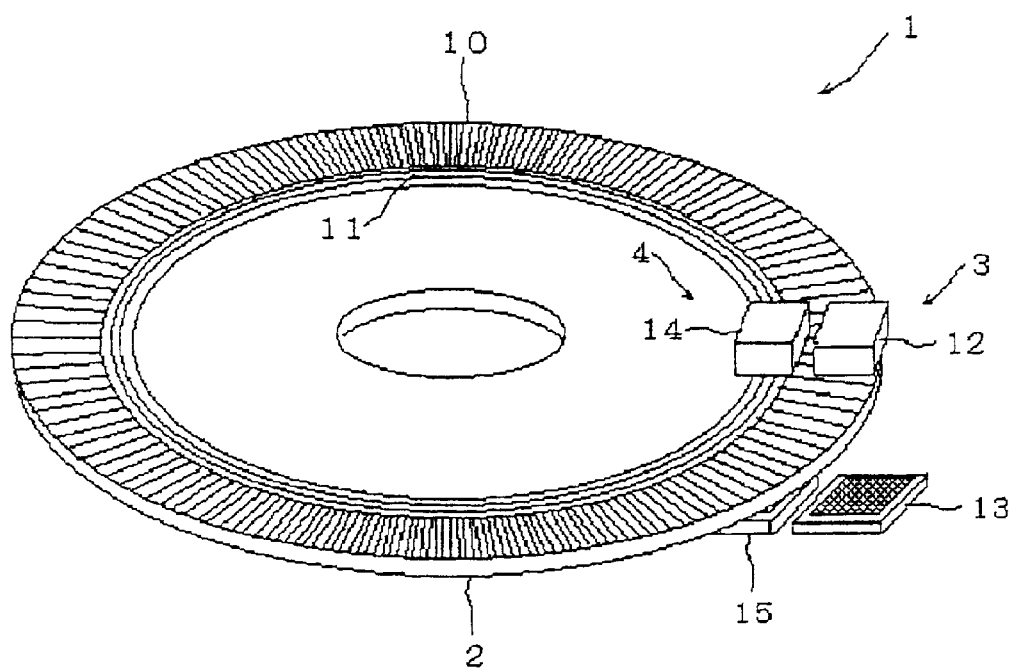
FIG. 31 shows a thirteenth embodiment of the present invention.

Referring to FIGS. 31 through 35, a thirteenth embodiment of the present invention will be described. As shown in FIG. 31, a rotary encoder, generally 1, includes an encoder wheel 2, a rotation sensing portion 3, and an eccentricity sensing section 4. The encoder wheel 2 is formed with a rotation scale 10 and an eccentricity scale 11 assigned to rotation sensing and eccentricity sensing, respectively. The rotation scale 10 is implemented as a diffraction grating. The eccentricity scale 11 is implemented as annular diffraction gratings concentric with each other.

Figure 32:
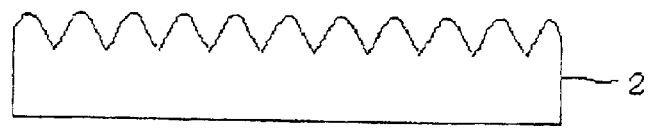
FIG. 32 is a section showing a relief diffraction grating applicable to the thirteenth embodiment.
Figure 33:
FIG. 33 is a section showing a volume diffraction grating also applicable to the thirteenth embodiment.

The diffraction grating constituting the rotation scale 10 has a narrow lattice configuration extending in the radial direction of the encoder wheel 2 and scaled at a preselected angle or angles. The concentric diffraction gratings constituting the eccentricity scale 11 extend in the circumferential direction of the encoder wheel 2. As shown in FIG. 32, the diffraction grating constituting the rotation scale or the eccentricity scale 11 may be implemented as a relief grating having an undulated surface. Alternatively, as shown in FIG. 33, the diffraction grating may be implemented as a volume grating constituted by portions with a different diffraction index formed in the encoder wheel 2.

Various conventional technologies are available for producing the encoder wheel 2. For example, a metal sheet maybe etched to form the rotation scale 10 and eccentricity scale 11. Alternatively, the two scales 10 and 11 may be patterned in a metal film formed on a glass sheet by a semiconductor process. Further, the scales 10 and 11 may be printed on a transparent substrate. Moreover, the scales 10 and 11 maybe formed by the photographic exposure and development of a photo emulsion film.

The rotary encoder 1 is characterized by the annular eccentricity scale 11. Therefore, the material, shape and other factors of the encoder wheel 2 are open to choice. For example, slits that are easy to form at low cost may be formed in the encoder wheel 2 at a pitch of several ten micrometers or less. Even such slits diffract light.

Figure 34:
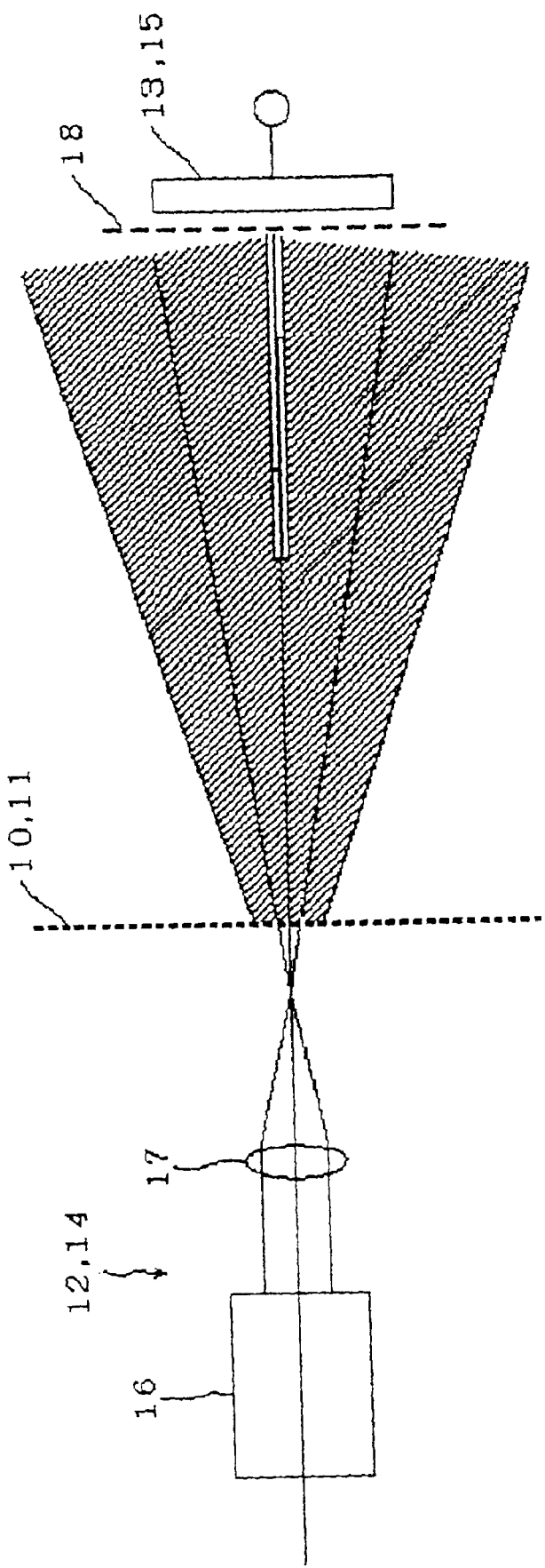
FIG. 34 is a front view showing a rotation and eccentricity sensing portion included in the thirteenth embodiment.

The rotation sensing portion 3 includes a light source portion 12 and a sensor 13. Likewise, the eccentricity sensing portion 4 includes a light source portion 14 and a sensor 15. FIG. 34 shows a specific configuration of the sensing portion 3 or 4. As shown, the sensing portion 3 or 4 includes a light source 16 and a lens 17. A mask 18 is positioned in front of the sensor 13 or 15.

In the light source portion 12 assigned to rotation, the light source 16 emits light toward the lens 17. The lens 17 focuses the incident light on a position just before the rotation scale 10 of the encoder wheel 2. The sensor 13 faces the light source portion 12 with the intermediary of the encoder wheel 2 and is positioned on the optical axis of the light issuing from the light source 16. The light focused on the position just before the rotation scale 10 is transmitted through and diffracted by the scale 10. As a result, the light forms interference fringes.

The mask 18 is a slit mask having the same period as the interference fringes. The light transmitted through the mask 18 is incident to the sensor 13, so that the sensor 13 outputs a rotation signal.

In the light source portion 14 assigned to eccentricity, the light source 16 emits light toward the lens 17. The lens 17 focuses the incident light on a position just before the eccentricity scale 11 of the encoder wheel 2. The sensor 15 faces the light source portion 14 with the intermediary of the encoder wheel 2 and is positioned on the optical axis of the light issuing from the light source 16. The light focused on the position just before the eccentricity scale 11 is transmitted through and diffracted by the scale 11. As a result, the light forms interference fringes. Again, the light transmitted through the mask 18 is incident to the sensor 15, so that the sensor 15 outputs an eccentricity signal.

Figure 35:
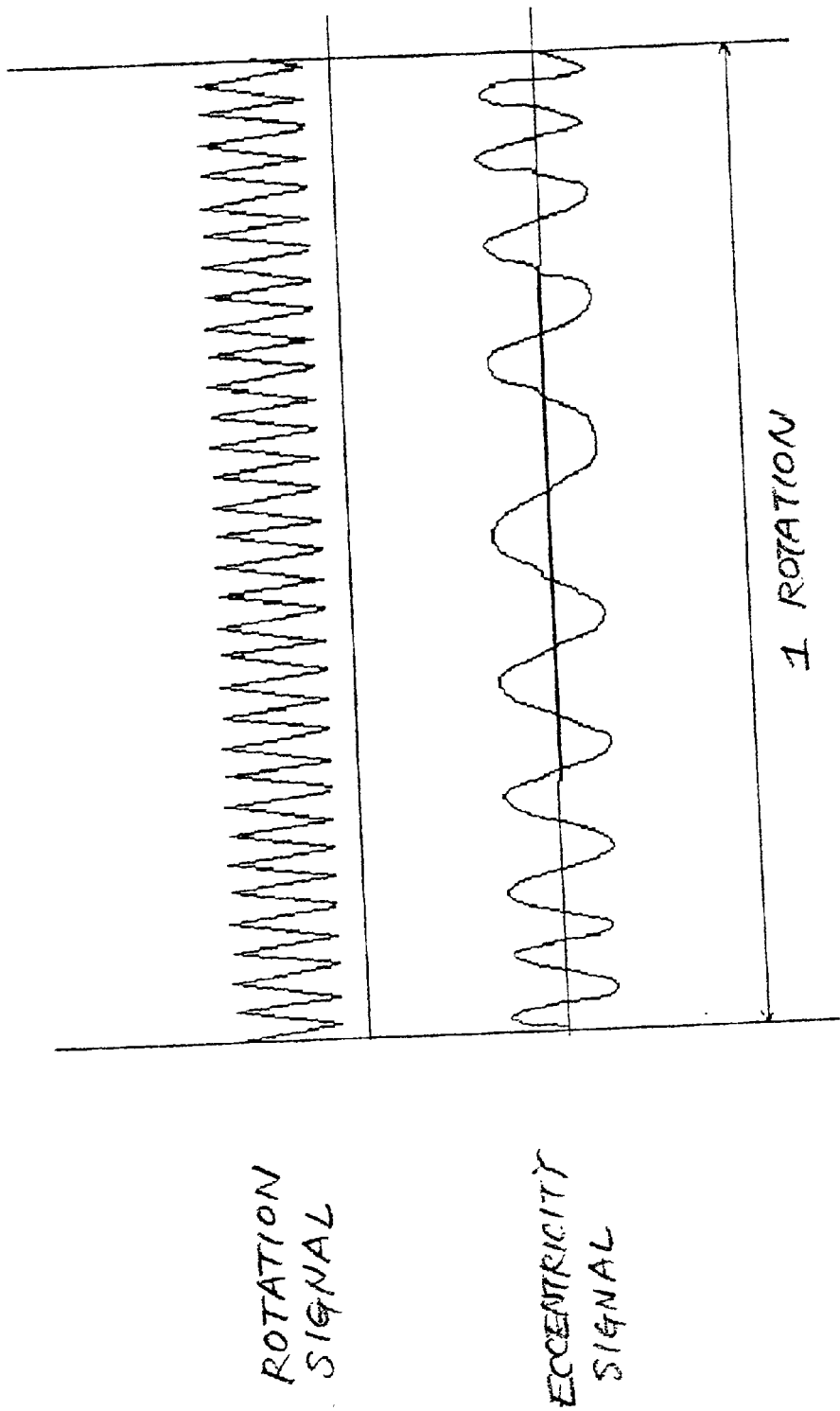
FIG. 35 is a graph showing a relation between a rotation signal and an eccentric signal with respect to one rotation of an encoder wheel particular to the thirteenth embodiment.

More specifically, the sensor 13 responsive to rotation outputs the rotation signal having a specific waveform shown in FIG. 35 for a single rotation of the encoder wheel 2. Likewise, the sensor 15 responsive to eccentricity outputs the eccentricity signal having a specific waveform shown in FIG. 35 for a single rotation of the encoder wheel 2.

So long as the rotation speed of the encoder wheel 2 is constant, the rotation signal has a sinusoidal waveform having a constant interval, as shown in FIG. 35. As for the eccentricity signal, the eccentricity component has a period corresponding to one rotation of the encoder wheel 2. Therefore, a number of eccentricity signals corresponding to the amount of eccentricity are output during one rotation of the encoder wheel 2. The eccentricity signal also has a sinusoidal waveform, as shown in FIG. 35.

Counters respectively count the rotation signal and eccentricity signal via respective rectangularity circuits, allowing the rotation angle and eccentricity of the encoder wheel 2 to be determined. With A- and B-phase signals, it is possible to specify the direction of rotation and that of eccentricity and to enhance resolution.

In the illustrative embodiment, not only the angular position but also the eccentricity of an encoder wheel can be sensed without resorting to conventional two sensors shifted in position from each other by the angle of 180°. The sensed eccentricity is used to correct the sensed angular position, so that the rotation angle can be accurately measured at low cost.

Fourteenth Embodiment

Figure 36:
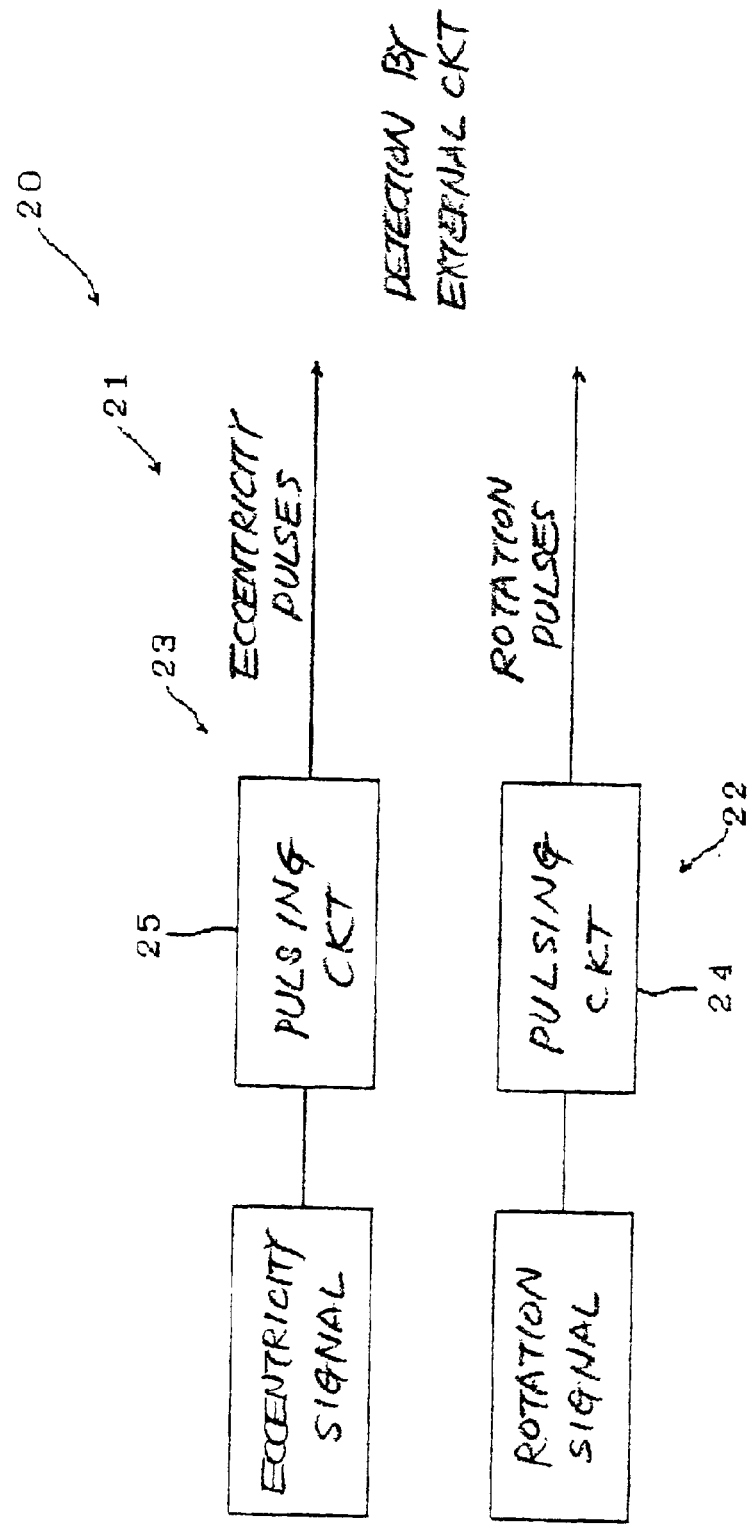
FIG. 36 is a schematic block diagram showing signal processing circuitry representative of a fourteenth embodiment of the present invention.

FIG. 36 shows a rotary encoder 20 representative of a fourteenth embodiment of the present invention. As shown, the rotary encoder 20 includes signal processing circuitry 21. The illustrative embodiment is applied to the rotary encoder described in relation to the thirteenth embodiment, so that identical structural elements are designated by identical reference numerals.

As shown in FIG. 36, the signal processing circuitry 21 is generally made up of a rotation signal processing section 22 and an eccentricity signal adjusting section 23. The rotation signal processing section 22 is implemented as a pulsing circuit 24 to which the analog rotation signal output from the sensor 13 is applied. The pulsing circuit 24 converts the analog rotation signal to rotation pulse signals. The rotation pulse signals are input to a counter, not shown, that follows the circuitry 21. The counter counts the rotation pulse signals for thereby outputting data representative of the position of the encoder wheel 2.

The eccentricity signal adjusting section 23 is implemented as a pulsing circuit 25 to which the analog eccentricity signal output from the sensor 15 is input. The pulsing circuit 25 converts the analog eccentricity signal to pulses corresponding to an amount of eccentricity for one rotation of the encoder wheel 2. The pulses are input to, e.g., a counter.

The operation of the rotary encoder 20 will be described hereinafter. The rotation signal output from the sensor 13 is an analog signal having a sinusoidal waveform, as shown in FIG. 35, and corresponding in number to the rotation scale 10. The pulsing circuit 24 converts the analog rotation signal to pulses and feeds the resulting rotation pulse signals to the counter. The counter outputs position data representative of the position of the encoder wheel 2. The position and angle of the encoder wheel 2 are determined on the basis of the position data.

On the other hand, the eccentricity signal output from the sensor 15 has a sinusoidal waveform, as shown in FIG. 35, and the number of which corresponds to an amount of eccentricity for one rotation of the encoder wheel 2. Therefore, the eccentricity signal cannot be directly used to determine the eccentricity of the encoder wheel 2. In the illustrative embodiment, the pulsing circuit 25 included in the adjusting section 23 converts the analog eccentricity signal to a number of pulses corresponding to an amount of eccentricity for one rotation of the encoder wheel 2. The pulses are input to, e.g., a counter, as stated earlier.

The illustrative embodiment can therefore accurately determine the eccentricity of the encoder wheel 2 as well as the position and angle of the encoder wheel 2. A- and B-phase pulses generated inside the encoder will allow an ordinary encoder counter to suffice for the above purpose.

Fifteenth Embodiment

Figure 37:
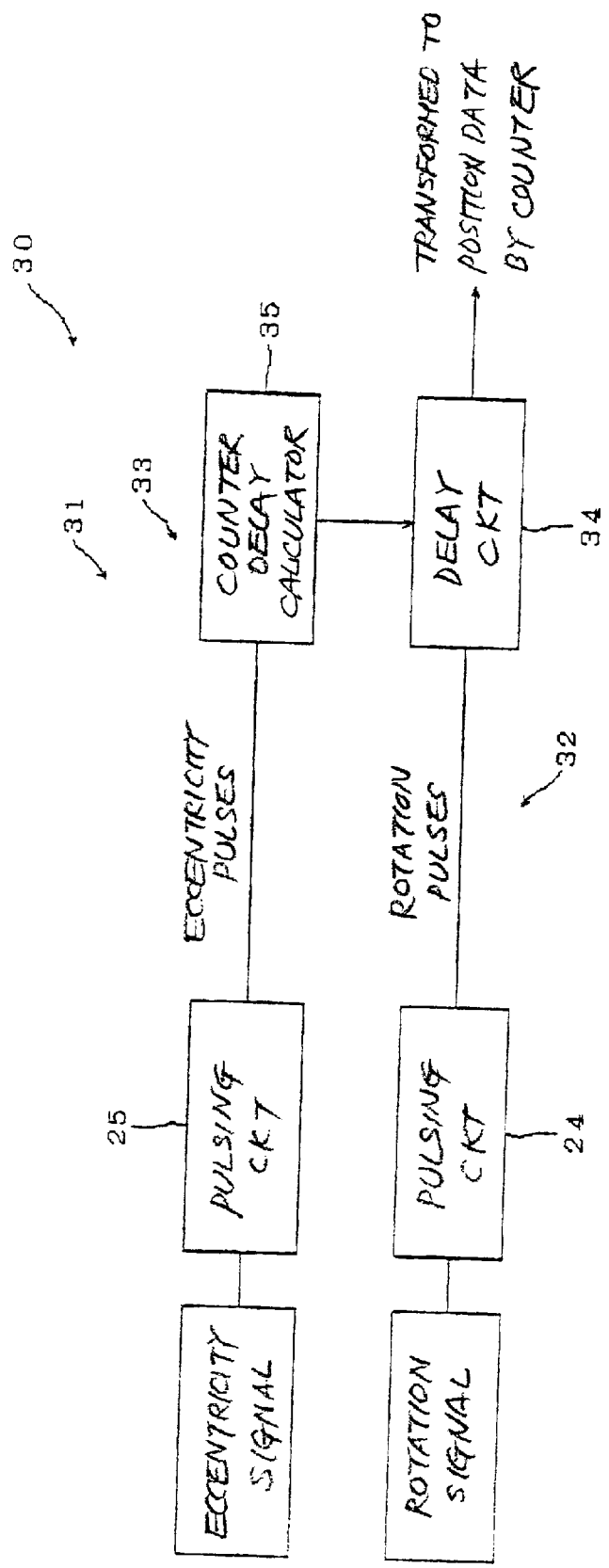
FIG. 37 is a schematic block diagram showing signal processing circuitry representative of a fifteenth embodiment of the present invention.

Reference will be made to FIG. 37 for describing a rotary encoder representative of a fifteenth embodiment of the present invention. The illustrative embodiment is also applied to the rotary encoder described in relation to the thirteenth embodiment, so that identical structural elements are designated by identical reference numerals.

As shown in FIG. 37, a rotary encoder, generally 30, includes signal processing circuitry 31 generally made up of a rotation signal processing section 32 and an eccentricity signal adjusting section 33. The rotation signal processing section 32 includes a delay circuit 34 in addition to the pulsing circuit 24. The eccentric signal adjusting section 33 includes a counter delay calculator 35.

In the eccentric signal adjusting circuit 33, the pulsing circuit outputs the previously stated analog eccentric pulse signals and delivers them to the counter delay calculator 35. The counter delay calculator 35 converts the pulse width of the pulse signals to that of the rotation pulses to be output from the pulsing circuit 24 and feeds the resulting pulse signal to the delay circuit 34.

In the rotation signal processing section 32, the pulsing circuit 24 outputs the analog rotation signals stated previously. The delay circuit 34 receives the eccentricity data having the pulse width of the rotation pulses from the counter delay calculator 35. The delay circuit 34 adjusts, based on the eccentricity data, the rotation pulse signals output from the pulsing circuit 24 to a pulse width corresponding to an amount of eccentricity.

More specifically, the delay circuit 34 calculates a rotation sensing error from the eccentricity data input from the counter delay calculator 35, translates the calculated error to a period of time corresponding to the rotation speed, and then multiplies the rotation pulses output from the pulsing circuit 24 by the delay. The delay circuit 34 may be implemented as software stored in a CPU. The delay circuit 34 and counter delay calculator 35 constitute signal adjusting means.

The light beam transmitted through and diffracted by the scale 10 is incident to the sensor 13. The resulting rotation signals output from the sensor 13 are input to the pulsing circuit 24. The pulsing circuit 24 outputs the rotation pulse signals Sp shown in FIG. 23. Again, assume that the eccentricity of the encoder wheel 2 is δ, that the slits have an angular period of θ, and that the encoder wheel 2 is eccentric. Then, an angle error of δθ occurs in the sensed angle of the slits, which constitute the rotation scale 10.

In light of the above, the rotation signal adjusting section 32 senses an angle detection error ascribable to eccentricity, transforms it to a pulse width, and then multiplies the rotation pulse width by a delay. As a result, as also shown in FIG. 23, a rotation pulse signal Spg output from the adjusting section 32 has a waveform having the error added to its output edge, as stated earlier.

In practice, it is difficult to multiply a delay in the negative direction with electric circuitry. This, however, can be coped with by setting a zero delay at a position where the error ascribable to the eccentricity of the encoder wheel 2 is minimum and causing the pulse period to increase with an increase in error. To multiply the rotation by a delay, it is necessary for the rotation speed, i.e., rotation pulse signals to be output first. It follows that the delay circuit 34 constitutes a cause of error except for continuous rotation. However, accurate measurement is achievable only if a function of determining whether or not the current rotation is continuous is provided.

Sixteenth Embodiment

A sixteenth embodiment of the present invention will be described with reference to FIGS. 38 and 39a through 39E. The illustrative embodiment is also applied to the rotary encoder described in relation to the thirteenth embodiment, so that identical structural elements are designated by identical reference numerals.

Figure 38:
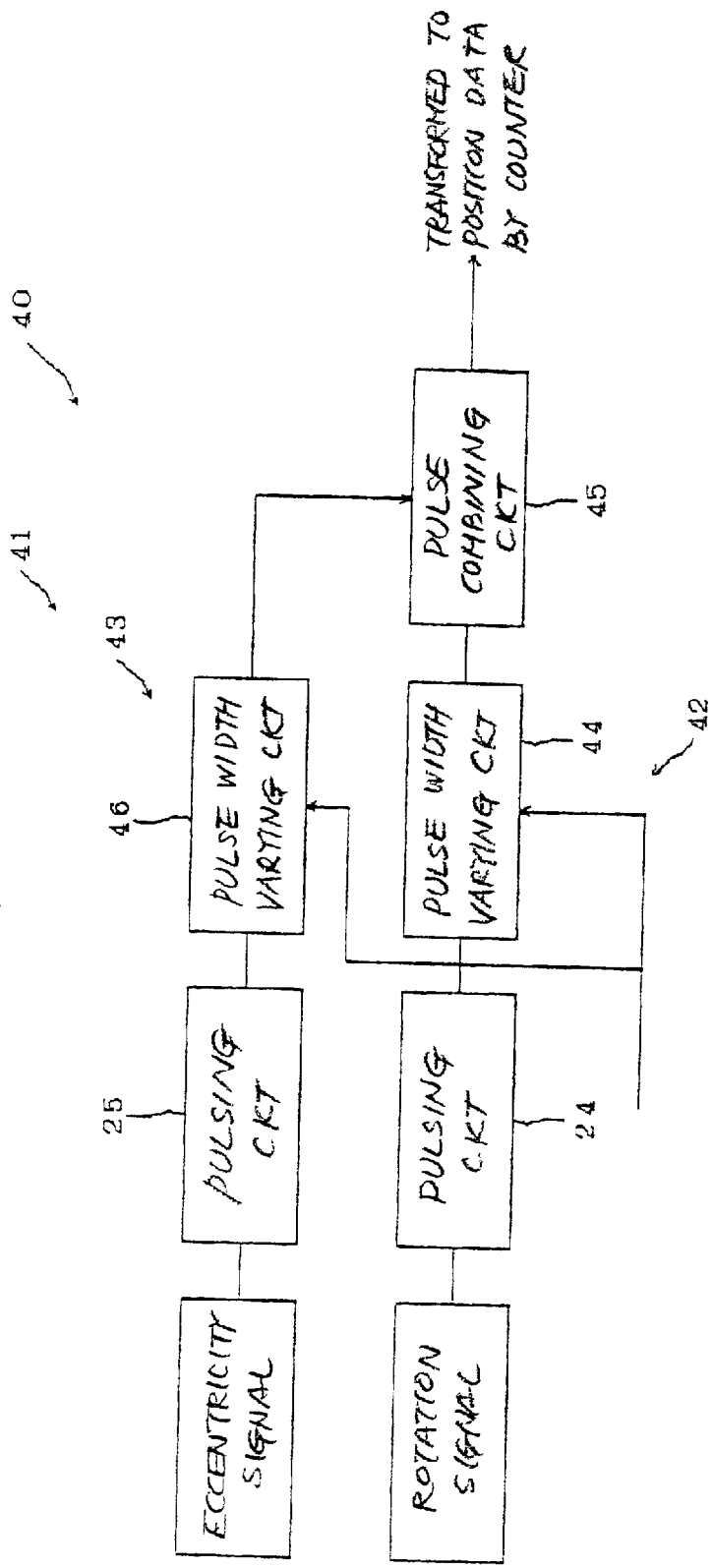
FIG. 38 is a schematic block diagram showing signal processing circuitry representative of a sixteenth embodiment of the present invention.

As shown in FIG. 38, a rotary encoder, generally 40, includes signal processing circuitry 41 generally made up of a rotation signal processing section 42 and an eccentricity signal processing section 43. The rotation signal processing section 42 includes a pulse width varying circuit 44 and a pulse combining circuit 45 in addition to the pulsing circuit 24. The eccentricity signal adjusting section 43 includes a pulse width varying circuit 46 in addition to the pulsing circuit 25.

Figures 39A, 39B, 39C, 39D, 39E:
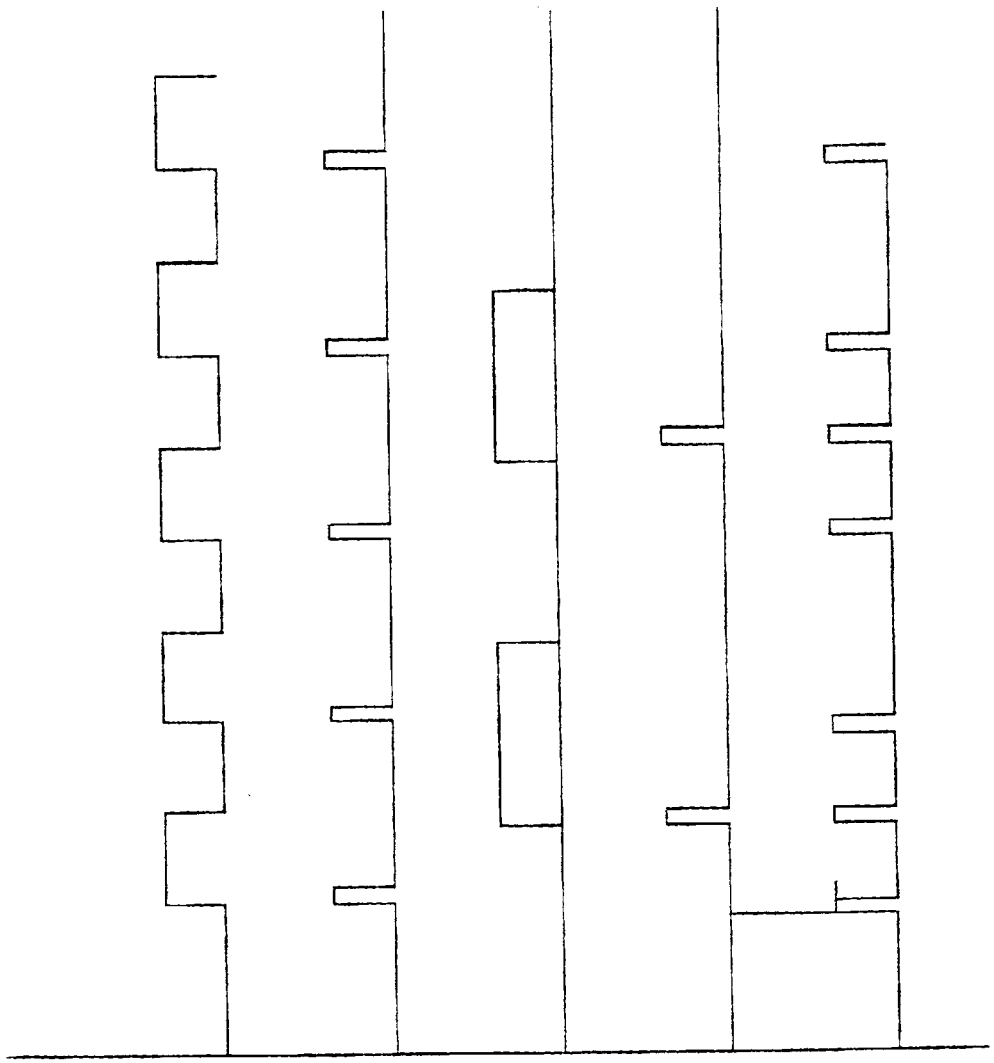
FIGS. 39A through 39E show the waveforms of signals appearing in the circuitry of FIG. 38.

In the eccentricity signal adjusting section 43, the pulsing circuit 25 outputs the pulses in accordance with the analog eccentricity signals output from the sensor 15 (see FIG. 35). FIG. 39C shows the pulses output from the adjusting section 43. A reference clock is input to the pulse width varying circuit 46 together with the pulses output from the pulsing circuit 25. The pulse width varying circuit 46 performs flip-flop operation at the positive going edge of each eccentricity pulse. The pulse width varying circuit outputs a narrow eccentricity pulse shown in FIG. 39D. As soon as the width of an eccentric pulse signal output from the pulsing circuit 25 reaches the width of one rotation pulse output from the pulsing circuit 24, the pulse width varying circuit 46 outputs a narrow eccentricity pulse shown in FIG. 39D. The narrow eccentricity pulse is fed to the pulse combining circuit 45.

In the rotation signal processing section 42, the pulsing circuit 24 outputs the previously stated pulses in accordance with the analog rotation signals shown (see FIG. 35) output from the sensor 13. The reference clock is input to the pulse width varying circuit 44 as well. Performing flip-flop operation at the positive-going edge of each rotation pulse, the pulse width varying circuit 44 reduces the duty ratio of the rotation pulse (duration of a high level) for thereby outputting a narrow rotation pulse shown in FIG. 39B. The pulse combining circuit 45 combines, or adds, the narrow eccentricity pulse and narrow rotation pulse to thereby produce corrected rotation pulses shown in FIG. 39E. The corrected rotation pulses correspond to an amount of eccentricity and are delivered to, e.g., a counter. This counter can be implemented by an ordinary counter because the pulses output from the pulse combining circuit 45 include eccentricity-corrected pulses in addition to the rotation signals.

As stated above, in the illustrative embodiment, an ordinary encoder circuit can perform counting and angle calculation with the rotation signals corrected beforehand. This further facilitates the use of accurate rotation signals at low cost.

Seventeenth Embodiment

Figure 40:
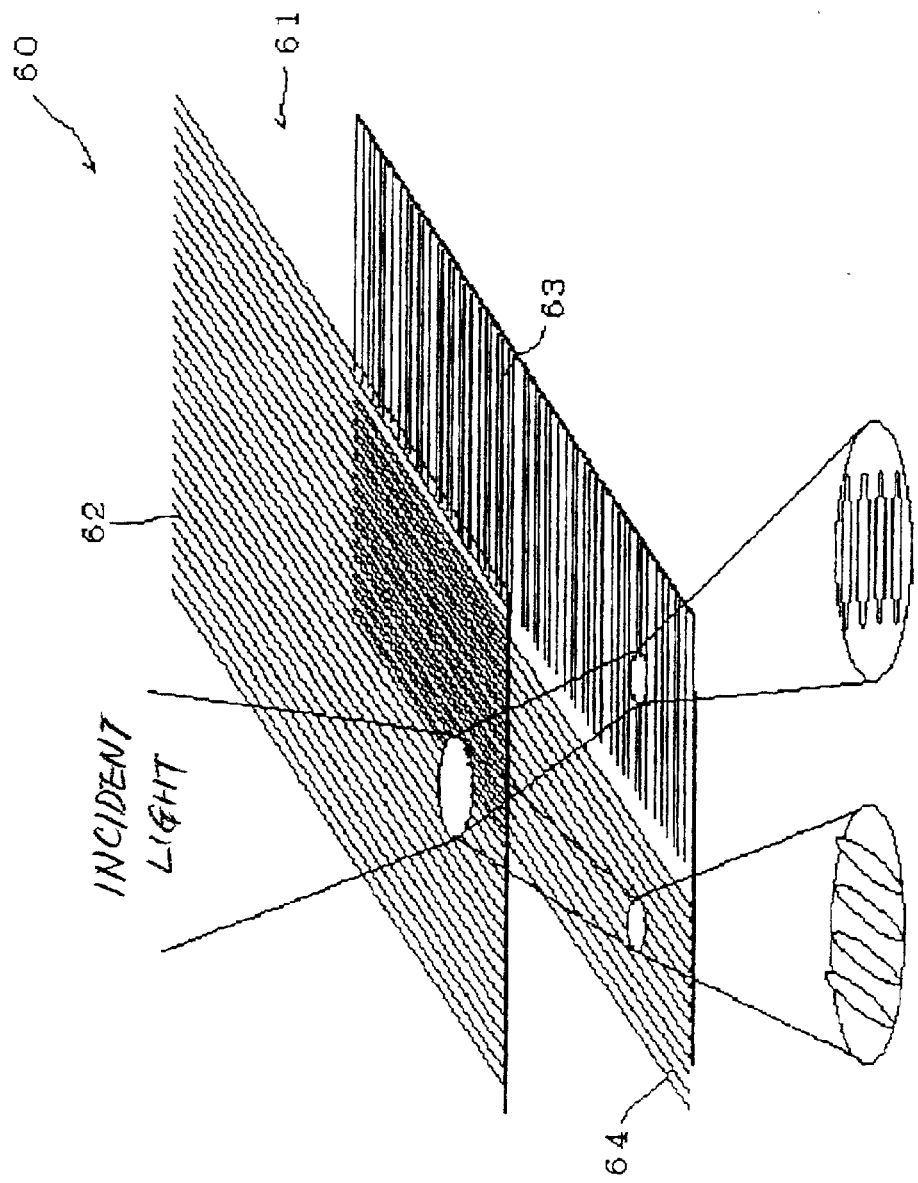
FIG. 40 shows a seventeenth embodiment of the present invention.

FIG. 40 shows a seventeenth embodiment of the present invention. The illustrative embodiment is also applied to the rotary encoder described in relation to the thirteenth embodiment, so that identical structural elements are designated by identical reference numerals.

As shown in FIG. 40, a rotary encoder 60 includes an encoder wheel 61 including a diffraction grating or beam splitting device 62, a rotation scale 63, and an eccentricity scale 64. The diffraction grating 62 is positioned at the light incidence side, i.e., above the two scales 63 and 64, as viewed in FIG. 40. The rotation scale 63 is implemented as a diffraction grating. The eccentricity scale 64 is implemented as annular, concentric diffraction gratings.

The diffraction grating constituting the rotation scale 10 has a narrow lattice configuration extending in the radial direction of the encoder wheel 2 and scaled at a preselected angle or angles. The concentric diffraction gratings constituting the eccentricity scale 11 extend in the circumferential direction of the encoder wheel 2.

The rotary encoder 60 includes a single light source, not shown, for emitting a light beam toward the diffraction grating 62, which is positioned at the light incidence side of the encoder wheel 61. The diffraction grating 62 splits the incident light beam into two beams. One of the two beams is incident to the rotation scale 63 while the other beam is incident to the eccentricity scale 64.

The beam transmitted through and diffracted by the rotation scale 63 forms interference fringes. The sensor 13 senses the interference fringes for thereby determining the rotation angle of the encoder wheel 61. Likewise, the sensor 15 senses interference fringes formed by the beam transmitted through and diffracted by the eccentricity scale 64, thereby determining the eccentricity of the encoder wheel 61.

Figure 41:
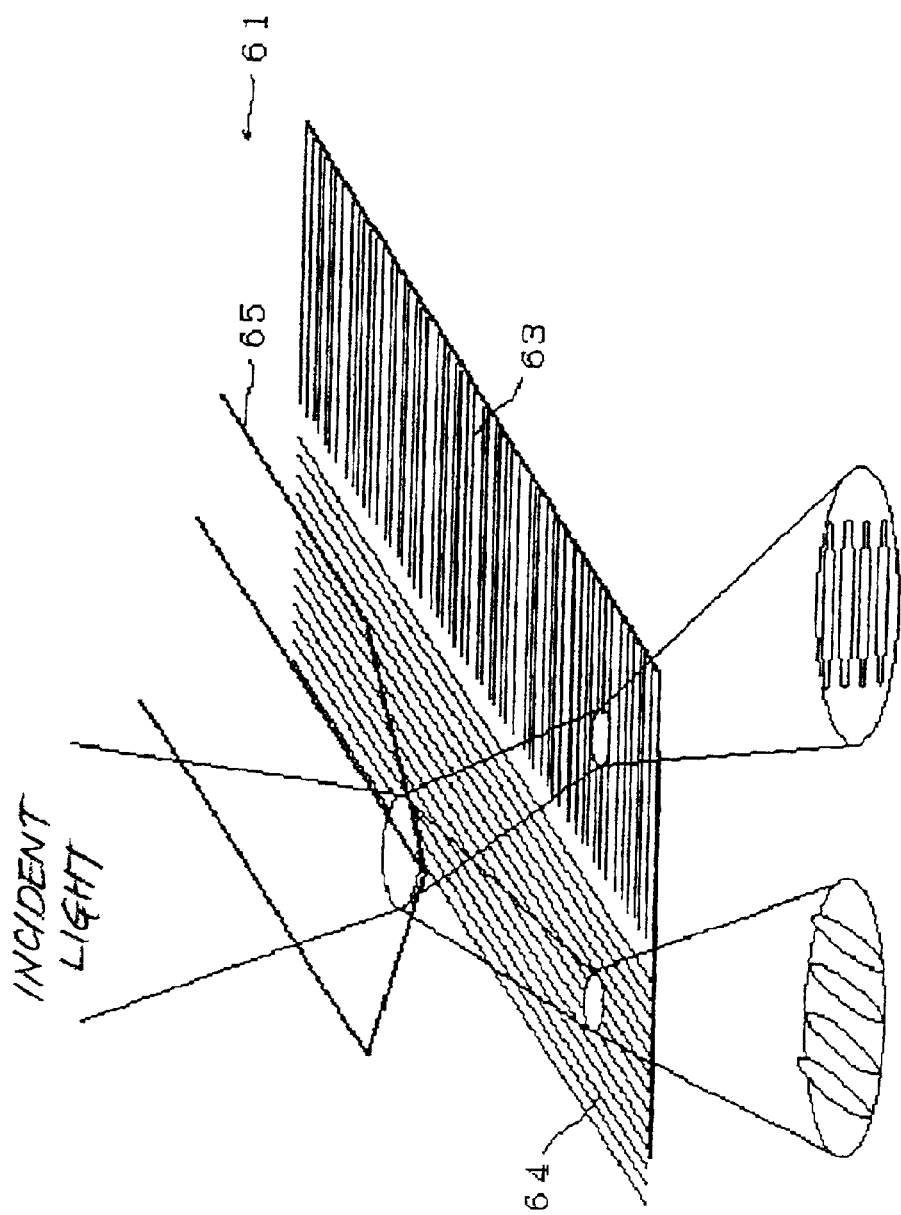
FIG. 41 shows a modification of the seventeenth embodiment.

FIG. 41 shows a prism 65 that may be substituted for the diffraction grating or beam splitting device 62. As shown, the prism 65 is positioned at the light incidence side of the encoder wheel 61. The function of the prism 65 is identical with the function of the diffraction grating 62 and will not be described specifically.

The illustrative embodiment does not need an expensive light source. Further, the beam splitting device formed on the encoder wheel 61 reduces the size of the rotary encoder and further promotes accurate measurement at low cost.

Eighteenth Embodiment

Figure 42:
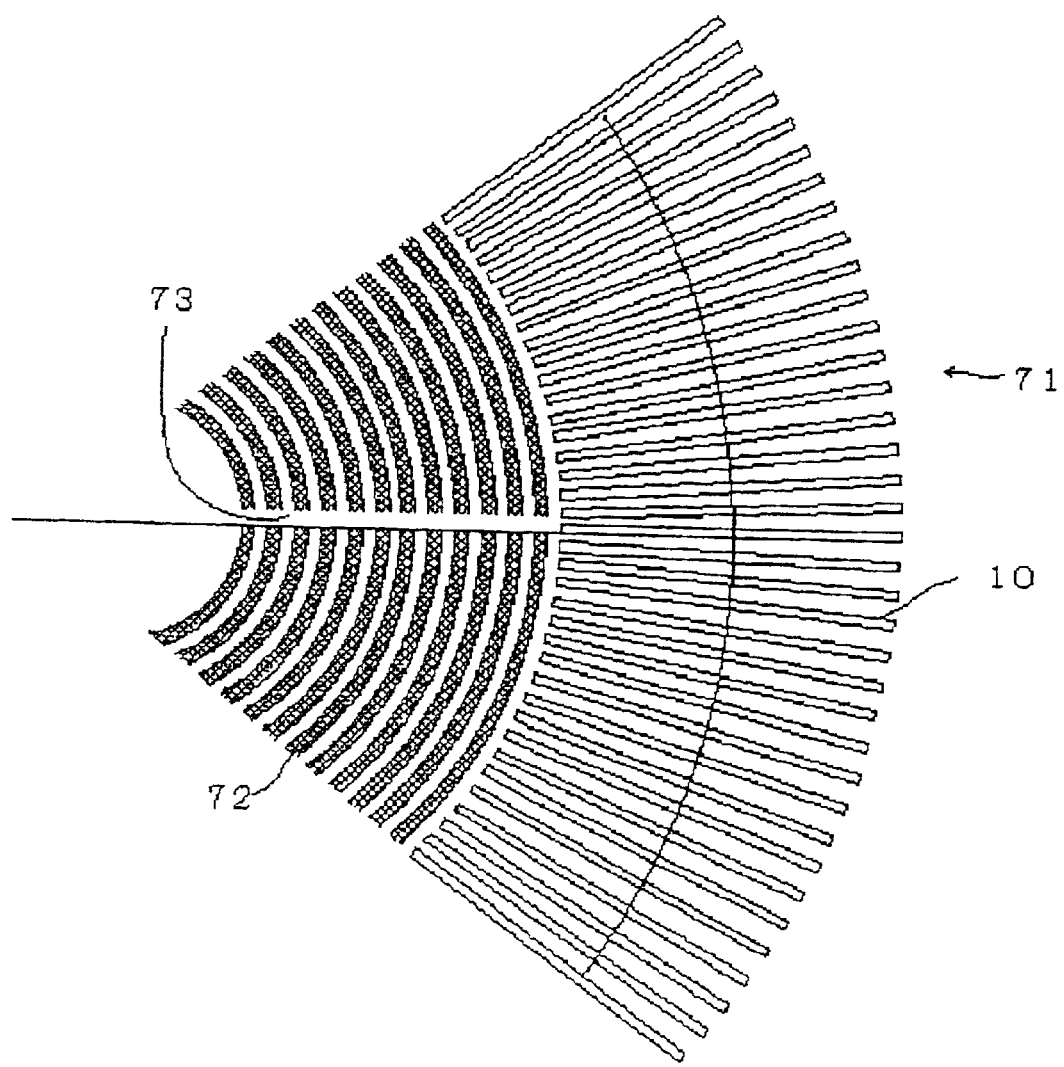
FIG. 42 shows an eighteenth embodiment of the present invention.

FIG. 42 shows an eighteenth embodiment of the present invention. The illustrative embodiment is also applied to the rotary encoder described in relation to the thirteenth embodiment, so that identical structural elements are designated by identical reference numerals.

As shown in FIG. 42, a rotary encoder, generally 70, includes an encoder wheel 71 formed with a rotation scale 10 and an eccentricity scale 72. The rotation scale 10 is implemented by a diffraction grating while the eccentricity scale 72 is implemented by annular, concentric diffraction gratings. The eccentricity scale 72 includes a mark 73 for sensing an origin. More specifically, a gap where the slit is absent is formed in part of the eccentricity scale 72, forming the mark 73 that intercepts light.

In operation, when the mark 73 of the eccentricity scale 11 intercepts the light beam output from the lens 17, the quantity of light incident to the sensor 15 becomes zero. With this configuration, it is possible to sense the origin of the encoder 70 in addition to eccentricity with a single optics.

The eccentricity signal varies far slower than the rotation signal, so that the omission of part of eccentricity data does not bring about a critical error. In light of this, the mark 73 may be formed at a plurality of points of the eccentricity scale 72. If desired, the mark 73 may be replaced with a code representative of an origin, e.g., a train of gaps where the slit is absent. The code allows the origin to be sensed a plurality of times for a single rotation of the encoder wheel 71, facilitating the return of the encoder to the origin.

In the thirteenth to eighteenth embodiments, the eccentricity signal is used to correct the rotation signal. If desired, the eccentricity signal may additionally be used as a signal representative of the mounting error of the sensing portion or that of the encoder wheel. In such a case, the eccentricity data may be directly output as analog data or may be provided with a threshold for outputting an error signal. The error signal urges the user to check the position of the sensing portion or the eccentricity of the encoder wheel outside of an allowable range.

The thirteenth to eighteenth embodiments described above achieve the same advantages as the seventh to twelfth embodiments.

What is claimed is:

1. An optical encoder comprising:
    a scale movable in a preselected direction and formed with an array of slits in a the direction of movement of said sale;
    a light source for emitting a light beam toward said scale; and
    a light-sensitive portion or transforming light transmitted through or reflected from said scale to a corresponding electric signal,
    wherein said slits each have a dimension, as measured in a direction perpendicular to the direction of movement of said scale, that is substantially equal to a dimension, as measured in the direction perpendicular to the direction of movement of said scale, of a beam spot to be formed on said scale.

2. The optical encoder as claimed in claim 1, wherein said light-sensitive portion has at least two zones divided in the direction perpendicular to the direction of movement of said scale.

3. The optical encoder as claimed in claim 2, wherein the light beam incident to said scale has a uniform intensity distribution and has, in the direction perpendicular to the direction of movement of said scale, a uniform shape distribution.

4. The optical encoder as claimed in claim 2, wherein the light beam issuing from said light source comprises two light beams spaced from each other by a distance substantially equal to the dimension, as measured in the direction perpendicular to the direction of movement of said scale, of each of said slits.

5. The optical encoder as claimed in claim 1, wherein the light beam partly overlaps one edge of said slit.

6. The optical encoder as claimed in claim 1, wherein said light-sensitive portion has at least two zones divided in the direction perpendicular to the direction of movement of said scale.

7. The optical encoder as claimed in claim 6, wherein the light beam issuing from said light source comprises two light beams spaced from each other by a distance substantially equal to a limited size of each of said slits.

8. The optical encoder as claimed in claim 6, wherein the light beam partly overlaps one edge of said slit.

9. The optical encoder as claimed in claim 1, wherein the light beam incident to said scale has a uniform intensity distribution and has, in the direction perpendicular to the direction of movement of said scale, a uniform shape distribution.

10. An optical encoding method comprising:
   forming a scale with an array of slits in a direction of movement of said scale;
   emitting a light beam toward said scale; and
   transforming light transmitted through or reflected from said scale to a corresponding electric signal using a light-sensitive portion,
   wherein said slits each have a dimension, as measured in a direction perpendicular to the direction of movement of said scale, that is substantially equal to a dimension, as measured in the direction perpendicular to the direction of movement of said scale, of a beam spot to be formed on said scale.

11. The method of claim 10, wherein the light-sensitive portion has at least two zones divided in the direction perpendicular to the direction of movement of said scale.

12. The method of claim 11, wherein the light beam incident to said scale has a uniform intensity distribution and has, in the direction perpendicular to the direction of movement of said scale, a uniform shape distribution.

13. The method of claim 11, wherein the light beam comprises two light beams spaced from each other by a distance substantially equal to the dimension, as measured in the direction perpendicular to the direction of movement of said scale, of each of said slits.

14. The method of claim 10, wherein the light beam partly overlaps one edge of said slit.

15. The method of claim 10, wherein said light-sensitive portion has at least two zones divided in the direction perpendicular to the direction of movement of said scale.

16. The method of claim 15, wherein the light beam issuing from said light source comprises two light beams spaced from each other by a distance substantially equal to the dimension, as measured in the direction perpendicular to the direction of movement of said scale, of each of said slits.

17. The method of claim 15, wherein the light beam partly overlaps one edge of said slit.

18. The method of claim 10, wherein the light beam incident to said scale has a uniform intensity distribution and has, in the direction perpendicular to the direction of movement of said scale, a uniform shape distribution.

* * * * *